US007044600B2

(12) United States Patent
Kumar et al.

(10) Patent No.: US 7,044,600 B2
(45) Date of Patent: May 16, 2006

(54) POLARIZING DEVICES AND METHODS OF MAKING THE SAME

(75) Inventors: Anil Kumar, Pittsburgh, PA (US); Peter C. Foller, Murrysville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 11/249,081

(22) Filed: Oct. 12, 2005

(65) Prior Publication Data

US 2006/0028615 A1 Feb. 9, 2006

Related U.S. Application Data

(62) Division of application No. 10/757,267, filed on Jan. 14, 2004.

(51) Int. Cl.
*G02C 7/10* (2006.01)

(52) U.S. Cl. .................... 351/163; 351/49; 351/177

(58) Field of Classification Search ................ 351/49, 351/163
See application file for complete search history.

(56) References Cited

U.S. PATENT DOCUMENTS

| | | | |
|---|---|---|---|
| 2,319,826 A | 5/1943 | Pellett | 428/324 |
| 2,334,446 A | 11/1943 | Serrell | 351/49 |
| 2,475,921 A | 7/1949 | Smith | 359/489 |
| 2,481,830 A | 9/1949 | Dreyer | 359/491 |
| 2,544,659 A | 3/1951 | Dreyer | 359/491 |
| 3,276,316 A | 10/1966 | Makas | 359/352 |
| 3,361,706 A | 1/1968 | Meriwether et al. | 252/586 |
| 3,653,863 A | 4/1972 | Araujo et al. | 65/30.11 |
| 4,039,254 A | 8/1977 | Harsch | 349/14 |
| 4,043,637 A | 8/1977 | Hovey | 359/241 |
| 4,166,043 A | 8/1979 | Uhlmann et al. | 252/600 |
| 4,190,330 A | 2/1980 | Berreman | 349/200 |
| 4,279,474 A | 7/1981 | Belgorod | 349/13 |
| 4,367,170 A | 1/1983 | Uhlmann et al. | 252/586 |
| 4,549,894 A | 10/1985 | Araujo et al. | 65/30.11 |
| 4,556,605 A | 12/1985 | Mogami et al. | 428/331 |
| 4,637,896 A | 1/1987 | Shannon | 252/299.7 |
| 4,648,925 A | 3/1987 | Goepfert et al. | 156/153 |
| 4,728,173 A | 3/1988 | Toth | 349/14 |
| 4,756,605 A | 7/1988 | Okada et al. | 349/13 |
| 4,756,973 A | 7/1988 | Sakagami et al. | 428/412 |
| 4,810,433 A | 3/1989 | Takayanagi et al. | 264/435 |
| 4,838,673 A | 6/1989 | Richards et al. | 351/44 |
| 4,863,763 A | 9/1989 | Takeda et al. | 427/355 |
| 4,865,668 A | 9/1989 | Goepfert et al. | 156/74 |
| 4,873,026 A | 10/1989 | Behre et al. | 562/72 |
| 4,873,029 A | 10/1989 | Blum | 264/1.32 |
| 4,931,220 A | 6/1990 | Haynes et al. | 252/586 |
| 4,974,941 A | 12/1990 | Gibbons et al. | 349/24 |
| 4,977,028 A | 12/1990 | Goepfert et al. | 428/426 |
| 5,024,850 A | 6/1991 | Broer et al. | 428/1.31 |
| 5,067,795 A | 11/1991 | Senatore | 349/14 |
| 5,073,294 A | 12/1991 | Shannon et al. | 252/299.01 |
| 5,130,353 A | 7/1992 | Fischer et al. | 524/43 |
| 5,155,607 A | 10/1992 | Inoue et al. | 349/84 |
| 5,180,470 A | 1/1993 | Smith et al. | 117/58 |
| 5,185,390 A | 2/1993 | Fischer et al. | 524/43 |
| 5,189,448 A | 2/1993 | Yaguchi | 351/162 |
| 5,202,053 A | 4/1993 | Shannon | 252/299.01 |
| 5,247,377 A | 9/1993 | Omeis et al. | 349/126 |
| 5,389,698 A | 2/1995 | Chigrinov et al. | 522/2 |
| 5,464,669 A | 11/1995 | Kang et al. | 427/558 |
| 5,602,661 A | 2/1997 | Schadt et al. | 344/124 |
| 5,608,567 A | 3/1997 | Grupp | 359/275 |
| 5,644,416 A | 7/1997 | Morikawa et al. | 349/86 |
| 5,645,767 A | 7/1997 | Van Gemert | 252/586 |
| 5,658,501 A | 8/1997 | Kumar et al. | 252/586 |
| 5,698,141 A | 12/1997 | Kumar | 252/586 |
| 5,723,072 A | 3/1998 | Kumar | 252/586 |
| 5,746,949 A | 5/1998 | Shen et al. | 252/585 |
| 5,903,330 A | 5/1999 | Fünfschilling et al. | 349/129 |
| 5,943,104 A | 8/1999 | Moddel et al. | 349/13 |

(Continued)

FOREIGN PATENT DOCUMENTS

EP 0 488 164 A2 11/1991

(Continued)

OTHER PUBLICATIONS

Kvasnikov, E.D., Kozenkov, V.M., and Barachevskii, V.A., "Birefringence in Polyvinylcinnamate Films Induced By Polarized Light," *Doklady Akademii nauk SSSR*, vol. 237, No. 3, USSR pp. 633-636 (1977).

Kozenkov, V.M., Chigrinov, V.G., and Kwok, H.S. "Photoanisotropic Effects in Poly (Vinyl-Cinnamate) Derivatives and Their Applications," *Mol. Cryst. Liq. Cryst.*, vol. 409, pp. 251-267 (2002).

Hikmet, R.A.M and de Witz, C., "Gel Layer for Inducting Adjustable Pretilt Angles in Liquid Crystal Systems," *J. App. Phys.* vol. 70, No. 3, pp. 1265-1266 (Aug. 1991).

(Continued)

*Primary Examiner*—Jordan M. Schwartz
*Assistant Examiner*—Jessica Stultz
(74) *Attorney, Agent, or Firm*—Linda Pingitore

(57) ABSTRACT

Certain, non-limiting embodiments of the disclosure provide ophthalmic elements and devices comprising an at least partial coating adapted to polarize at least transmitted radiation on at least a portion of at least one exterior surface of an ophthalmic element or substrate. Further, according to certain non-limiting embodiments, the at least partial coating adapted to polarize at least transmitted radiation comprises at least one at least partially aligned dichroic material. Other non-limiting embodiments of the disclosure provide methods of making ophthalmic elements and devices comprising forming an at least partial coating adapted to polarize at least transmitted radiation on at least a portion of at least one exterior surface of the ophthalmic element or substrate. Optical elements and devices and method of making the same are also disclosed.

20 Claims, No Drawings

U.S. PATENT DOCUMENTS

| | | | |
|---|---|---|---|
| 5,962,617 A | 10/1999 | Slagel | 528/61 |
| 6,022,497 A | 2/2000 | Kumar | 252/586 |
| 6,025,026 A | 2/2000 | Smith et al. | 427/316 |
| 6,049,428 A | 4/2000 | Khan et al. | 359/491 |
| 6,060,001 A | 5/2000 | Welch et al. | 252/586 |
| 6,113,814 A | 9/2000 | Gemert et al. | 252/586 |
| 6,150,430 A | 11/2000 | Walters et al. | 522/79 |
| 6,153,126 A | 11/2000 | Kumar | 252/586 |
| 6,160,597 A | 12/2000 | Schadt et al. | 349/98 |
| 6,187,444 B1 | 2/2001 | Bowles, III et al. | 428/423.1 |
| 6,239,778 B1 | 5/2001 | Palffy-Muhoray et al. | 345/87 |
| 6,245,399 B1 | 6/2001 | Sahouani et al. | 428/1.31 |
| 6,268,055 B1 | 7/2001 | Walters et al. | 428/413 |
| 6,284,418 B1 | 9/2001 | Trantolo | 430/20 |
| 6,334,681 B1 | 1/2002 | Perrott et al. | 351/159 |
| 6,338,808 B1 | 1/2002 | Kawata et al. | 252/299.4 |
| 6,369,869 B1 | 4/2002 | Schadt et al. | 349/129 |
| 6,432,544 B1 | 8/2002 | Stewart et al. | 428/424.2 |
| 6,433,043 B1 | 8/2002 | Misura et al. | 523/424.2 |
| 6,436,525 B1 | 8/2002 | Welch et al. | 428/332 |
| 6,506,488 B1 | 1/2003 | Stewart et al. | 428/332 |
| 6,531,076 B1 | 3/2003 | Crano et al. | 252/586 |
| 6,555,028 B1 | 4/2003 | Walters et al. | 252/586 |
| 6,597,422 B1 | 7/2003 | Fünfschilling et al. | 349/123 |
| 6,602,603 B1 | 8/2003 | Welch et al. | 428/412 |
| 6,717,644 B1 | 4/2004 | Schadt et al. | 349/124 |
| 6,761,452 B1 * | 7/2004 | Moravec et al. | 351/177 |
| 2002/0039627 A1 | 4/2002 | Ichihashi et al. | 428/1.1 |
| 2002/0090516 A1 | 7/2002 | Loshak et al. | 428/412 |
| 2002/0167639 A1 | 11/2002 | Coates et al. | 349/187 |
| 2002/0180916 A1 | 12/2002 | Schadt et al. | 349/117 |
| 2003/0045612 A1 | 3/2003 | Misura et al. | 523/456 |
| 2004/0046927 A1 * | 3/2004 | Montgomery | 351/46 |
| 2004/0223221 A1 * | 11/2004 | Sugimura et al. | 359/490 |
| 2005/0003107 A1 | 1/2005 | Kumar et al. | 428/1.1 |
| 2005/0004361 A1 | 1/2005 | Kumar et al. | 544/71 |
| 2005/0012998 A1 | 1/2005 | Kumar et al. | 359/494 |
| 2005/0146680 A1 | 7/2005 | Muisener et al. | 351/163 |

FOREIGN PATENT DOCUMENTS

| | | |
|---|---|---|
| EP | 0 543 678 A1 | 5/1993 |
| EP | 0 397 263 B1 | 12/1994 |
| EP | 0 772 069 A1 | 10/1996 |
| EP | 0 331 233 B1 | 4/1997 |
| EP | 1 162 482 A2 | 12/2001 |
| EP | 1 203 967 A1 | 5/2002 |
| EP | 1 394 595 A1 | 3/2004 |
| GB | 583842 | 1/1947 |
| GB | 2 169 417 A | 9/1986 |
| JP | 59 135428 A | 3/1984 |
| JP | 03 200118 A | 2/1991 |
| JP | 03 200218 A | 2/1991 |
| WO | WO 89/11674 | 11/1989 |
| WO | WO 97/22894 | 6/1997 |
| WO | WO 98/19207 | 7/1998 |
| WO | WO 00/19252 | 6/2000 |
| WO | WO 00/77559 | 12/2000 |
| WO | WO 01/02449 | 1/2001 |
| WO | WO 01/55960 | 8/2001 |
| WO | WO 02/29489 | 4/2002 |
| WO | WO 02/058921 | 8/2002 |
| WO | WO 03/019270 | 3/2003 |
| WO | WO 03/032066 A1 | 4/2003 |
| WO | WO 2005/084826 A1 | 9/2005 |
| WO | WO 2005/085912 A1 | 9/2005 |

OTHER PUBLICATIONS

Schadt, Martin et al. "Surface-Induced Parallel Alignment of Liquid Crystals by Linearly Polymerized Photopolymers," *Jpn. J. Appl. Phys.* vol. 31, No. 7, pp. 2155-2164 (Jul. 1992).

Schadt, Martin "Optics and Applications of Photo-Aligned Liquid Crystalline Surfaces," *Nonlinear Optics*, vol. 25, pp. 1-12 (2000).

Schadt, Martin "Liquid Crystal Displays and Novel Optical Thin Films Enabled by Photo-Alignment," *Mol. Cryst. Liq. Cryst.* vol. 364, pp. 151-169 (2001).

Dyadyusha, A.G. et al. "Light-induced Planar Orientation of a Nematic Liquid Crystal on an Anisotropic Surface without Microrelief," *Ukr. Fiz. Zhurn*, (Ukraine), vol. 35, No. 5, pp. 1059-1062.

Castellano, Joseph A. "Surface Anchoring of Liquid Crystal Molecules on Various Substrates," *Mol. Cryst. Liq. Cryst.*, vol. 94, pp. 33-41 (1983).

Huang, D.D. et al. "Effect of Aligning Layer Thickness on Photo-Aligned Ferroelectric Liquid Crystal Displys," *Proceedings of the 6th Chinese Optoelectronics Symposium, Hong Kong China*, IEEE (New York), pp. 231-234 (2003).

Chigrinov, V.G. and Kozenkov, V.M., "New Results on Liquid Crystal Alignment by Photopolymerization," *Proceedings of the SPIE- The Internationali Society for Optical Engineering*, SPIE vol. 2409 pp. 130-140 (1995).

Thomas Bachels, et al., "Novel Photo-Aligned LC-Polymer Wide-View Film for TN Displays", *Eurodisplay*, (2002), pp. 183-186.

Hubert Seiberle, Carsten Benecke and Thomas Bachels, "Invited Paper: Photo-Aligned Anisotropic Optical Thin Films," *SID 03 Digest*, SID (2003), pp. 1162-1165.

* cited by examiner

POLARIZING DEVICES AND METHODS OF MAKING THE SAME

CROSS-REFERENCE TO RELATED APPLICATIONS

This application is a division of U.S. application Ser. No. 10/757,267, filed Jan. 14, 2004.

STATEMENT REGARDING FEDERALLY SPONSORED RESEARCH OR DEVELOPMENT

Not applicable.

REFERENCE TO A SEQUENCE LISTING

Not applicable.

BACKGROUND

Polarizing ophthalmic devices, such as polarizing sunglasses, can reduce glare due to light reflected off surfaces, such as but not limited to pavement, water, and snow, thereby enhancing vision under glare conditions. Consequently, polarizing ophthalmic devices have become of increasing interest for use in sports and other outdoor activities in which reflected glare can be problematic.

Conventional polarizing filters for ophthalmic devices are formed from sheets or layers of a polymeric material that has been stretched or otherwise oriented and impregnated with an iodine chromophore or dichroic dye. For example, one method of forming a conventional polarizing filter for ophthalmic devices is to heat a sheet or layer of polyvinyl alcohol ("PVA") to soften the PVA and then stretch the sheet to orient the PVA polymer chains. Thereafter, an iodine chromophore or dichroic dye is impregnated into the sheet such that the iodine or dye molecules attach to the aligned polymer chains and take on a particular order or alignment. Alternatively, the iodine chromophore or the dichroic dye can be first impregnated into the PVA sheet, and thereafter the sheet can be heated and stretched as described above to orient the PVA polymer chains and associated chromophore or dye.

Iodine chromophores and dichroic dyes are dichroic materials, that is, they absorb one of two orthogonal plane-polarized components of transmitted radiation more strongly than the other. Although dichroic materials will preferentially absorb one of two orthogonal plane-polarized components of transmitted radiation, if the molecules of the dichroic material are not suitably positioned or arranged, no net polarization of transmitted radiation will be achieved. That is, due to the random positioning of the molecules of the dichroic material, the selective absorption by the individual molecules will cancel each other such that no net or overall polarizing effect is achieved. However, by suitably positioning or arranging the molecules of the dichroic material within the oriented polymer chains of the PVA sheet, a net polarization can be achieved. That is, the PVA sheet can be made to polarize transmitted radiation, or in other words, a polarizing filter can be formed. As used herein, the term "polarize" means to confine the vibrations of the electric vector of light waves to one direction.

One method of forming a polarizing ophthalmic device utilizing such polarizing polymer sheet filters is to laminate or glue the filter to the convex outer surface of a lens substrate. Another method of forming lenses utilizing conventional polarizing polymer sheet filters involves lining the surface of a lens mold with the polarizing sheet and subsequently filling the mold with the substrate material such that the polarizing sheet is on the surface of the lens when removed from the mold. Still other methods involve the incorporation of the filter into the lens structure itself. For example, the filter can be incorporated into the lens structure by laminating the filter between two substrates that together form the lens, or by casting a substrate material around the filter. In the latter method, the polarizing filter can be placed into a mold and the mold filled with the substrate material, typically a thermosetting plastic monomer, such that the substrate material surrounds and encapsulates the polarizing filter. Thereafter, the substrate material can be cured to form the lens.

It is also known to form a polarizing layer by forming a film of a linear photo-polymerizable material exhibiting selective orientation on a release layer component of a transfer foil. Thereafter, a liquid crystal polymer material containing a dichroic dye can be applied to the linear photo-polymerizable material and the chains of the liquid crystal polymer aligned. Since a dichroic dye is contained within the liquid crystal polymer, when the liquid crystal polymer chains are aligned, the dichroic dye molecules are also aligned and a net polarization effect can be achieved. The polarizing layer can then be transferred from the transfer foil to a suitable substrate by, for example, hot stamping.

Other methods of forming polarizing sheets or layers using liquid crystal materials are also known. For example, polarizing sheets formed from oriented thermotropic liquid crystal films containing dichroic dyes have been disclosed. Further, polarizing sheets formed by extruding liquid crystalline polymers that contain dichroic dyes covalently linked as part of the main polymer chains have been disclosed.

SUMMARY

Various non-limiting embodiments disclosed herein provide optical elements and devices and ophthalmic elements and devices. For example, one non-limiting embodiment provides an ophthalmic element comprising an at least partial coating adapted to polarize at least transmitted radiation on at least a portion of at least one exterior surface of the ophthalmic element.

Another non-limiting embodiment provides an ophthalmic element comprising at least one orientation facility on at least a portion of at least one exterior surface of the ophthalmic element, and an at least partial coating adapted to polarize at least transmitted radiation on at least a portion of the at least one orientation facility.

Another non-limiting embodiment provides an ophthalmic element comprising at least one at least partial coating comprising an alignment medium on at least a portion of at least one exterior surface of the ophthalmic element, at least one at least partial coating comprising an alignment transfer material on at least a portion of the at least one at least partial coating comprising the alignment medium, and at least one at least partial coating comprising an anisotropic material and at least one dichroic material on at least a portion of the at least one at least partial coating comprising the alignment transfer material.

Still another non-limiting embodiment provides an ophthalmic element comprising a substrate, at least one orientation facility comprising an at least partial coating comprising a photo-orientable polymer network on at least a portion of at least one exterior surface of the substrate, and an at least partial coating adapted to polarize at least transmitted radiation on at least a portion of the at least one at least partial coating comprising the photo-orientable polymer network, the at least partial coating adapted to polarize at least transmitted radiation comprising a liquid crystal polymer and at least one dichroic dye.

Yet another non-limiting embodiment provides an optical element comprising an at least partial coating adapted to polarize at least transmitted radiation on at least a portion of at least one exterior surface of the optical element, the at least partial coating comprising an at least partially ordered liquid crystal material and at least one at least partially aligned dichroic material.

Another non-limiting embodiment provides an optical device comprising at least one optical element comprising an at least partial coating comprising an alignment medium on at least a portion of at least one exterior surface of the at least one optical element, and an at least partial coating comprising an anisotropic material and at least one dichroic material on at least a portion of the at least one at least partial coating comprising the alignment medium.

Other non-limiting embodiments disclosed herein provide methods of making optical elements and ophthalmic elements. For example, one non-limiting embodiment provides a method of making an ophthalmic element comprising forming an at least partial coating adapted to polarize at least transmitted radiation on at least a portion of at least one exterior surface of the ophthalmic element.

Another non-limiting embodiment provides a method of making an ophthalmic element comprising imparting at least one orientation facility comprising an at least partial coating comprising an alignment medium on at least a portion of at least one exterior surface of the ophthalmic element, applying at least one dichroic material to at least a portion of the at least one orientation facility, and at least partially aligning at least a portion of the at least one dichroic material.

Another non-limiting embodiment provides a method of making an ophthalmic element comprising applying an at least partial coating to at least a portion of at least one exterior surface of the ophthalmic element, and adapting at least a portion of the at least partial coating to polarize at least transmitted radiation.

Still another non-limiting embodiment provides a method of making an ophthalmic element comprising applying an at least partial coating comprising an alignment medium to at least a portion of at least one exterior surface of the ophthalmic element, at least partially ordering at least a portion of the alignment medium, applying an at least partial coating comprising an anisotropic material and at least one dichroic material to at least a portion of the at least partial coating comprising the at least partially ordered alignment medium, and at least partially aligning at least a portion of the at least one dichroic material.

Another non-limiting embodiment provides a method of making a lens for ophthalmic applications comprising applying an at least partial coating comprising a photo-orientable polymer network to at least a portion of at least one exterior surface of a lens, at least partially ordering at least a portion of the photo-orientable polymer network with plane-polarized ultraviolet radiation, applying an at least partial coating comprising a liquid crystal material and at least one dichroic dye to at least a portion of the at least one at least partial coating comprising the photo-orientable polymer network, at least partially aligning at least a portion of the at least partial coating comprising the liquid crystal material and the at least one dichroic dye, and at least partially setting at least a portion of the coating comprising the liquid crystal polymer and the at least one dichroic dye.

Still another non-limiting embodiment provides a method of making an optical element comprising applying an at least partial coating to at least a portion of at least one exterior surface of the optical element, and adapting at least a portion of the at least partial coating to polarize at least transmitted radiation.

DETAILED DESCRIPTION

As used in this specification and the appended claims, the articles "a," "an," and "the" include plural referents unless expressly and unequivocally limited to one referent.

Additionally, for the purposes of this specification, unless otherwise indicated, all numbers expressing quantities of ingredients, reaction conditions, and other properties or parameters used in the specification are to be understood as being modified in all instances by the term "about." Accordingly, unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

Further, while the numerical ranges and parameters setting forth the broad scope of the invention are approximations as discussed above, the numerical values set forth in the Examples section are reported as precisely as possible. It should be understood, however, that such numerical values inherently contain certain errors resulting from the measurement equipment and/or measurement technique.

Elements and devices according to various non-limiting embodiments of the present invention will now be described. One non-limiting embodiment provides an optical element, and more specifically provides an ophthalmic element comprising an at least partial coating adapted to polarize at least transmitted radiation on at least a portion of at least one exterior surface of the ophthalmic element.

As previously discussed, "polarize" means to confine the vibrations of the electric vector of light waves to one direction. Further as previously discussed, conventional polarizing ophthalmic elements, such as lenses for ophthalmic devices, are typically formed by laminating or molding a polarizing filter formed from a stretched PVA sheet (or layer) containing a dichroic material, such as an iodine chromophore, to a lens substrate. However, according various non-limiting embodiments disclosed herein, the ophthalmic element comprises an at least partial coating adapted to polarize at least transmitted radiation on at least a portion of at least one exterior surface of the ophthalmic element. Thus, according to these non-limiting embodiments, the conventional laminate structure discussed above is not required. As used herein the preposition "on" means that the subject coating is directly connected to the object surface or indirectly connected to the object surface though one or more other coatings or structures. Further, as used herein the term "coating" means a film, which may or may not have a uniform thickness, and specifically excludes the stretched polymer sheets of the prior art.

The term "ophthalmic" as used herein refers to elements and devices that are associated with the eye and vision, such as, but not limited to, lenses for eyewear, and eyewear. Thus, for example, according to various non-limiting embodiments disclosed herein, the ophthalmic element can be chosen from corrective lenses, non-corrective lenses, and magnifying lenses.

Further, the ophthalmic elements according to various non-limiting embodiments disclosed herein can be formed from any suitable substrate material, including but not limited to, glasses and organic materials.

For example, according to various non-limiting embodiments disclosed herein, the ophthalmic element can be formed from an organic substrate material. Suitable organic substrate materials for use in conjunction with various non-limiting embodiments disclosed herein include, but are not limited to, the art-recognized polymers that are useful as ophthalmic elements, e.g., organic optical resins that are used to prepare optically clear castings for optical applications, such as ophthalmic lenses.

Specific, non-limiting examples of organic substrate materials that may be used to form the ophthalmic elements disclosed herein include polymeric materials, for examples, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; poly(urea urethane) polymers, which are prepared, for example, by the reaction of a polyurethane prepolymer and a diamine curing agent, a composition for one such polymer being sold under the trademark TRIVEX by PPG Industries, Inc.; polyol(meth) acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly (ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co-and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers. While, the exact nature of the organic substrate material is not critical to various non-limiting embodiments disclosed herein, in one non-limiting embodiment, the organic substrate material should be chemically compatible with the at least partial coatings adapted to polarize at least transmitted radiation on at least a portion of at least one exterior surface of the ophthalmic element.

Further, according to certain non-limiting embodiments disclosed herein, the substrates forming the ophthalmic elements may have a protective coating, such as, but not limited to, an abrasion-resistant coating, such as a "hard coat," on their exterior surfaces. For example, commercially available thermoplastic polycarbonate lens substrates are often sold with an abrasion-resistant coating already applied to their exterior surfaces because these surfaces tend to be readily scratched, abraded or scuffed. An example of such a lens substrate is the GENTEX™ polycarbonate lens (available from Gentex Optics). Therefore, as used herein the term "substrate" includes a substrate having an protective coating, such as but not limited to an abrasion-resistant coating, on its surface(s).

Still further, the ophthalmic elements and substrates used to form the ophthalmic elements according to various non-limiting embodiments disclosed herein can be untinted, tinted, photochromic, or tinted-photochromic ophthalmic elements.

As used herein the term "untinted" with respect to ophthalmic elements and substrates means essentially free of coloring agent additions (such as, but not limited to, conventional dyes) and having an absorption spectrum for visible radiation that does not vary significantly in response to actinic radiation. As used herein "actinic radiation" means electromagnetic radiation that is capable of causing a response. Although not limiting herein, actinic radiation can include both visible and ultraviolet radiation.

As used herein the term "tinted" with respect to ophthalmic elements and substrates means containing a coloring agent addition (such as, but not limited to, conventional dyes) and having an absorption spectrum for visible radiation that does not vary significantly in response to actinic radiation.

As used herein the term "photochromic" means having an absorption spectrum for visible radiation that varies in response to at least actinic radiation and is thermally reversible. Although not limiting herein, for example, photochromic elements, substrates, coatings, and materials that can be used in conjunction with various non-limiting embodiments disclosed herein may change from a clear state to colored state in response radiation, or they may change from one colored state to another colored state in response to radiation. For example, in one non-limiting embodiment the photochromic ophthalmic element may change from a clear state to a colored state in response to actinic radiation and revert back to the clear state in response to thermal radiation or heat. Alternatively, the photochromic ophthalmic element may change from a first colored state to a second colored state in response to actinic radiation and revert back to the first color state in response to thermal radiation or heat.

As used herein the term "tinted-photochromic" with respect to the ophthalmic elements and substrates means containing a coloring agent addition and a photochromic material, and having an absorption spectrum for visible radiation that varies in response to at least actinic radiation and is thermally reversible. Thus for example, in one non-limiting embodiment, the tinted-photochromic substrate can have a first color characteristic of the coloring agent and a second color characteristic of the combination of the coloring agent the photochromic material when exposed to actinic radiation.

As discussed above, the ophthalmic elements according to various non-limiting embodiments disclosed herein comprise an at least partial coating adapted to polarize at least transmitted radiation on at least a portion of at least one exterior surface of the ophthalmic elements. As used herein the term "transmitted radiation" refers to radiation that is passed through at least a portion of an element or substrate.

Although not limiting herein, the transmitted radiation can be visible radiation or can be a combination of visible radiation and ultraviolet radiation. According to various non-limiting embodiments disclosed herein, the at least partial coating can be adapted to polarize transmitted visible radiation, or it can be adapted to polarize a combination of transmitted visible and transmitted ultraviolet radiation.

Further, the at least partial coating adapted to polarize at least transmitted radiation on at least a portion of at least one exterior surface of the ophthalmic element can comprise at least one dichroic material. As used herein the terms "dichroic material" and "dichroic dye" refers to a material that absorbs one of two orthogonal plane-polarized components of at least transmitted radiation more strongly than the other. One measure of how strongly the dichroic material absorbs one of two orthogonal plane-polarized components is the "absorption ratio." As used herein the term "absorption ratio" refers to the ratio of the absorbance of radiation linearly polarized in a first plane to the absorbance of the same wavelength radiation linearly polarized in a plane orthogonal to the first plane, wherein the first plane is taken as the plane with the highest absorbance. Methods of determining absorption ratios are described in detail in the Examples section below.

Dichroic materials that can be used in conjunction with various non-limiting embodiments disclosed herein include, but are not limited to, dichroic materials having an absorption ratios ranging from 2 to 30 (or higher as required). For example, according to certain non-limiting embodiments, the dichroic material can have an absorption ratio of at least 3, at least 5, at least 7, at least 10 or greater. Further, combinations of dichroic materials having different absorption ratios can be used in accordance with various non-limiting embodiments disclosed herein. For example, in one non-limiting embodiment, the at least partial coating adapted to polarize at least transmitted radiation can comprise a first dichroic material having a first absorption ratio and at least one second dichroic material having a second absorption ratio that is different than the first absorption ratio.

Non-limiting examples of dichroic materials that are suitable for use in conjunction with various non-limiting embodiments described herein include azomethines, indigoids, thioindigoids, merocyanines, indans, quinophthalonic dyes, perylenes, phthaloperines, triphenodioxazines, indoloquinoxalines, imidazo-triazines, tetrazines, azo and (poly) azo dyes, benzoquinones, naphthoquinones, anthraquinone and (poly)anthraquinones, anthrapyrimidinones, iodine and iodates.

Although not limiting herein, in one non-limiting embodiment, the dichroic material is chosen from azo and poly(azo) dyes. In another non-limiting embodiment, the dichroic material is anthraquinones and (poly)anthraquinones.

Further, in another non-limiting embodiment, the dichroic material can be a polymerizable dichroic material. That is, according to this non-limiting embodiment, the dichroic material can comprise at least one group that is capable of being polymerized (i.e., a "polymerizable group"). For example, although not limiting herein, in one non-limiting embodiment the at least one dichroic material can have at least one alkoxy, polyalkoxy, alkyl, or polyalkyl substituent terminated with at least one polymerizable group.

According to one non-limiting embodiment, the at least partial coating adapted to polarize at least transmitted radiation on at least a portion of at least one exterior surface of the ophthalmic element can comprise at least one dichroic material and at least one anisotropic material. As used herein the term "anisotropic" means having at least one property that differs in value when measured in at least one different direction. Thus, "anisotropic materials" are materials that have at least one property that differs in value when measured in at least one different direction. For example, although not limiting herein, the anisotropic materials that can be used in conjunction with various non-limiting embodiments disclosed herein can be optically anisotropic materials.

Non-limiting examples of anisotropic materials that are suitable for use in conjunction with various non-limiting embodiments disclosed herein include liquid crystal materials chosen from liquid crystal polymers, liquid crystal pre-polymers, and liquid crystal monomers. As used herein the term "pre-polymer" means partially polymerized materials. For example, according one non-limiting embodiment, the at least partial coating adapted to polarize at least transmitted radiation on at least a portion of at least one exterior surface of the ophthalmic element can comprise at least one dichroic material and at least one anisotropic material chosen from liquid crystal polymers, liquid crystal pre-polymers, and liquid crystal monomers.

Liquid crystal monomers that are suitable for use as anisotropic materials in conjunction with various non-limiting embodiments disclosed herein include mono-functional as well as multi-functional liquid crystal monomers. Further, according to various non-limiting embodiments disclosed herein, the liquid crystal monomer can be a cross-linkable liquid crystal monomer, and can further be a photocross-linkable liquid crystal monomer. As used herein the term "photocross-linkable" means a material, such as a monomer, a pre-polymer or a polymer, that can be cross-linked on exposure to actinic radiation.

Non-limiting examples of cross-linkable liquid crystal monomers suitable for use as anisotropic materials according to various non-limiting embodiments disclosed herein include liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers and blends thereof. Non-limiting examples of photocross-linkable liquid crystal monomers suitable for use as anisotropic materials according to various non-limiting embodiments disclosed herein include liquid crystal monomers having functional groups chosen from acrylates, methacrylates, alkynes, epoxides, thiols, and blends thereof.

Liquid crystal polymers and pre-polymers that are suitable for use as anisotropic materials in conjunction with various non-limiting embodiments disclosed herein include thermotropic liquid crystal polymers and pre-polymers, and lyotropic liquid crystal polymers and pre-polymers. Further, the liquid crystal polymers and pre-polymers can be main-chain polymers and pre-polymers or side-chain polymers and pre-polymers. Additionally, according to various non-limiting embodiments disclosed herein, the liquid crystal polymer or pre-polymer can be cross-linkable, and further can be photocross-linkable.

Non-limiting examples of suitable liquid crystal polymers and pre-polymers that are suitable for use as anisotropic materials according to various non-limiting embodiments disclosed herein include, but are not limited to, main-chain and side-chain polymers and pre-polymers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof.

Non-limiting examples of photocross-linkable liquid crystal polymers and pre-polymers that are suitable for use as anisotropic materials according to various non-limiting embodiments disclosed herein include those polymers and pre-polymers having functional groups chosen from acrylates, methacrylates, alkynes, epoxides, thiols, and blends thereof.

Additionally, although not limiting herein, in accordance with various non-limiting embodiments, at least a portion of the anisotropic material can be at least partially ordered and at least a portion of the at least one dichroic material can be at least partially aligned with at least a portion of the at least partially ordered anisotropic material. As used herein the term "ordered" means brought into a suitable arrangement or position, such as by alignment with another structure or by some other force or effect. Further, as used herein the term "aligned" means brought into suitable arrangement or position by interaction with another structure.

As previously discussed, while dichroic materials absorb one of two orthogonal plane-polarized components of transmitted radiation more strongly than the other, the molecules of the dichroic material must be suitably positioned or arranged to achieve a net polarization of transmitted radiation. Thus, according to various non-limiting embodiments disclosed herein, at least a portion of the at least one dichroic material can be brought into suitable position or arrangement (i.e., ordered or aligned) such that an overall polarization effect can be achieved.

For example, in one non-limiting embodiment, the at least partial coating can comprise an at least partially ordered anisotropic material (such as, but not limited to a liquid crystal material) and at least one at least partially aligned dichroic material, wherein the at least one at least partially aligned dichroic material is at least partially aligned with the at least partially ordered anisotropic material. Although not limiting herein, according to this non-limiting embodiment at least a portion of the at least one dichroic material can be at least partially aligned such that the long axis of the at least a portion of the at least one dichroic material is generally parallel to the direction of the order of the anisotropic material.

In another non-limiting embodiment, the at least one dichroic material can bonded to or reacted with at least a portion of the anisotropic material. For example, according to this non-limiting embodiment, the at least one dichroic material can be polymerized into or reacted with at least a portion of the anisotropic material. Further, although not limiting herein, according to this non-limiting embodiment, the at least one dichroic material can comprise at least one substituent containing terminal and/or pendant groups selected from hydroxyl, carboxyl, (meth)acryloxy, 2—(methacryloxy)ethylcarbamyl (—OC(O)NHC$_2$H$_4$OC(O)C(CH$_3$)=CH$_2$), epoxy or a mixture thereof.

In addition to the at least one dichroic material and the at least one anisotropic material, the at least partial coating adapted to polarize at least transmitted radiation on at least a portion of at least one exterior surface of the ophthalmic element according to various non-limiting embodiments disclosed herein can further comprise at least one photochromic material. As previously discussed, photochromic materials have an absorption spectrum that varies in response to at least actinic radiation.

For example, although not limiting herein, the at least one photochromic material can be chosen from pyrans, oxazines, fulgides and fulgimides, and metal dithizonates. However, according to various non-limiting embodiments, the particular photochromic material selected is not critical, and its selection will depend on the ultimate application and the color or hue desired for that application. In one non-limiting embodiment, the at least one photochromic material has at least one absorption maximum between 300 and 1000 nanometers when activated (i.e. exposed to actinic radiation).

Further, in some non-limiting embodiments, the at least partial coating can comprise a mixture of photochromic materials. Generally, although not limiting herein, when two or more photochromic materials are used in combination, the photochromic materials are often chosen to complement one another to produce a desired color or hue. For example, mixtures of photochromic materials can be used according to certain non-limiting embodiments disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors.

Non-limiting examples of photochromic pyrans that can be used in conjunction with various non-limiting embodiments disclosed herein include benzopyrans, naphthopyrans, e.g., naphtho[1,2-b]pyrans, naphtho[2,1-b]pyrans, spiro-9-fluoreno[1,2-b]pyrans, phenanthropyrans, quinopyrans, and indeno-fused naphthopyrans, such as those disclosed in U.S. Pat. No. 5,645,767; spiropyrans, e.g., spiro(benzindoline) naphthopyrans, spiro(indoline)benzopyrans, spiro(indoline) naphthopyrans, spiro(indoline)quinopyrans and spiro(indoline)pyrans; and heterocyclic-fused napthopyrans, such as those disclosed in U.S. Pat. Nos. 5,723,072, 5,698,141, 6,153,126, and 6,022,497, which are hereby incorporated by reference. More specific examples of naphthopyrans and the complementary organic photochromic substances are described from column 11, line 57 through column 13, line 36 in U.S. Pat. No. 5,658,501, which are hereby specifically incorporated by reference herein.

Non-limiting examples of photochromic oxazines that can be used in conjunction with various non-limiting embodiments disclosed herein include benzoxazines, naphthoxazines, and spiro-oxazines, e.g., spiro(indoline)naphthoxazines, spiro(indoline)pyridobenzoxazines, spiro (benzindoline)pyridobenzoxazines, spiro(benzindoline) naphthoxazines, spiro(indoline)benzoxazines, and spiro (indoline)fluoranthenoxazine.

Non-limiting examples of photochromic fulgides and fulgimides that can be used in conjunction with various non-limiting embodiments disclosed herein include the 3-furyl and 3-thienyl fulgides and fulgimides, which are at column 20, line 5 through column 21, line 38 in U.S. Pat. No. 4,931,220 (which are hereby specifically incorporated by reference) and mixtures of any of the aforementioned photochromic materials/compounds.

Non-limiting examples of photochromic metal dithizonates that can be used in conjunction with various non-limiting embodiments disclosed herein include mercury dithizonates, which are described in, for example, U.S. Pat. No. 3,361,706, which is hereby specifically incorporated by reference herein.

In addition, it is contemplated that photochromic materials such as photochromic dyes and photochromic compounds encapsulated in metal oxides may be used in accordance with various non-limiting embodiments disclosed herein. See, for example, the materials described in U.S. Pat. Nos. 4,166,043 and 4,367,170, which are hereby specifically incorporated by reference herein. Additionally, polymerizable photochromic materials, such as those disclosed in U.S.

Pat. No. 6,113,814, which is hereby specifically incorporated by reference herein, and compatiblized photochromic materials, such as those disclosed in U.S. Pat. No. 6,555,028, which is hereby specifically incorporated by reference herein, can also be used in conjunction with various non-limiting embodiments disclosed herein.

Still further, according to various non-limiting embodiments disclosed herein, the at least partial coating adapted to polarize at least transmitted radiation can further comprise at least one additive that may facilitate one or more of the processing, the properties, or the performance of the at least partial coating. Non-limiting examples of such additives include dyes, alignment promoters, kinetic enhancing additives, photoinitiators, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, and adhesion promoters (such as hexanediol diacrylate and coupling agents). In one non-limiting embodiment, the additive is a dye.

As used herein, the term "alignment promoter" means an additive that can facilitate at least one of the rate and uniformity of the alignment of a material to which it is added. Non-limiting examples of alignment promoters that can be present in the at least partial coatings according to various non-limiting embodiments disclosed herein include those described in U.S. Pat. No. 6,338,808 and U.S. Patent Publication No. 2002/0039627, which are hereby specifically incorporated by reference herein.

Non-limiting examples of dyes that can be present in the at least partial coating according to various non-limiting embodiments disclosed herein include organic dyes that are capable of imparting a desired color or optical properties to the at least partial coating.

Non-limiting examples of kinetic enhancing additives that can be present in the at least partial coating according to various non-limiting embodiments disclosed herein include epoxy-containing compounds, organic polyols, and/or plasticizers. More specific examples of such kinetic enhancing additives are disclosed in U.S. Pat. No. 6,433,043 and U.S. Patent Publication No. 2003/0045612, which are hereby specifically incorporated by reference herein.

Non-limiting examples of photoinitiators that can be present in the at least partial coating according to various non-limiting embodiments disclosed herein include cleavage-type photoinitiators and abstraction-type photoinitators. Non-limiting examples of cleavage-type photoinitiators include acetophenones, α-aminoalkylphenones, benzoin ethers, benzoyl oximes, acylphosphine oxides and bisacylphosphine oxides or mixtures of such initiators. A commercial example of such a photoinitiator is DAROCURE® 4265, which is available from Ciba Chemicals, Inc. Non-limiting examples of abstraction-type photoinitiators include benzophenone, Michler's ketone, thioxanthone, anthraquinone, camphorquinone, fluorone, ketocoumarin or mixtures of such initiators.

Another non-limiting example of a photoinitiator that can be present in the at least partial coating according to various non-limiting embodiments disclosed herein is a visible light photoinitiator. Non-limiting examples of suitable visible light photoinitiators are set forth at column 12, line 11 to column 13, line 21 of U.S. Pat. No. 6,602,603, which are specifically incorporated by reference herein.

Non-limiting examples of solvents that can be present in the at least partial coating according to various non-limiting embodiments disclosed herein include those that will dissolve solid components of the coating, that are compatible with the coating and the ophthalmic elements and substrates, and/or can ensure uniform coverage of the exterior surface(s) to which the coating is applied. Potential solvents include, but are not limited to, the following: acetone, amyl propionate, anisole, benzene, butyl acetate, cyclohexane, dialkyl ethers of ethylene glycol, e.g., diethylene glycol dimethyl ether and their derivates (sold as CELLOSOLVE® industrial solvents), diethylene glycol dibenzoate, dimethyl sulfoxide, dimethyl formamide, dimethoxybenzene, ethyl acetate, isopropyl alcohol, methyl cyclohexanone, cyclopentanone, methyl ethyl ketone, methyl isobutyl ketone, methyl propionate, propylene carbonate, tetrahydroduran, toluene, xylene, 2-methoxyethyl ether, 3-propylene glycol methyl ether, and mixtures thereof.

The ophthalmic elements according to various non-limiting embodiments disclosed herein can further comprise one or more other coatings that can facilitate bonding, adhering, or wetting of the at least partial coating adapted to polarize at least transmitted radiation on the at least a portion of the at least one exterior surface of the ophthalmic elements. For example, the ophthalmic elements according to one non-limiting embodiment can comprise an at least partial primer coating between at least a portion of the at least partial coating adapted to polarize at least transmitted radiation and at least a portion of the at least one exterior surface of the ophthalmic elements. Further, although not required, according to this non-limiting embodiment, the primer coating can serve as a barrier coating to prevent interaction of the coating ingredients with the ophthalmic element or substrate surface and vice versa.

Non-limiting examples of primer coatings that can be used in conjunction with various non-limiting embodiments disclosed herein include coatings comprising coupling agents, at least partial hydrolysates of coupling agents, and mixtures thereof. As used herein "coupling agent" is means a material having at least one group capable of reacting, binding and/or associating with a group on at least one surface. In one non-limiting embodiment, a coupling agent can serve as a molecular bridge at the interface of at least two surfaces that can be similar or dissimilar surfaces. Coupling agents, in another non-limiting embodiment, can be monomers, oligomers and/or polymers. Such materials include, but are not limited to, organo-metallics such as silanes, titanates, zirconates, aluminates, zirconium aluminates, hydrolysates thereof and mixtures thereof. As used herein the phrase "at least partial hydrolysates of coupling agents" means that at least some to all of the hydrolyzable groups on the coupling agent are hydrolyzed. In addition to coupling agents and/or hydrolysates of coupling agents, the primer coatings can comprise other adhesion enhancing ingredients. For example, although not limiting herein, the primer coating can further comprise an adhesion-enhancing amount of an epoxy-containing material. Adhesion-enhancing amounts of an epoxy-containing materials when added to the coupling agent containing coating composition can improve the adhesion of a subsequently applied coating as compared to a coupling agent containing coating composition that is essentially free of the epoxy-containing material. Other non-limiting examples of primer coatings that are suitable for use in conjunction with the various non-limiting embodiments disclosed herein include those described U.S. Pat. No. 6,602,603 and U.S. Pat. No. 6,150,430, which are hereby specifically incorporated by reference.

Further, the ophthalmic elements according various non-limiting embodiments disclosed herein can further comprise at least one additional at least partial coating chosen from photochromic coatings, anti-reflective coatings, transitional coatings, primer coatings, and protective coatings on at least a portion of the ophthalmic element. For example, although not limiting herein, the at least one additional at least partial coating can be on at least a portion of the at least partial coating adapted to polarize at least transmitted radiation, i.e., as an overcoat. Additionally or alternatively, the at least partial coating adapted to polarize radiation can be on at least a portion of a first exterior surface of the ophthalmic element, and the at least one additional at least partial coating can be on at least a portion of a second exterior surface of the ophthalmic element, wherein the first exterior surface of the ophthalmic element is opposite the second exterior surface of the ophthalmic element.

Non-limiting examples of photochromic coatings include coatings comprising any of the photochromic materials that are discussed above. For example, although not limiting herein, the photochromic coatings can be photochromic polyurethane coatings, such as those described in U.S. Pat. No. 6,187,444; photochromic aminoplast resin coatings, such as those described in U.S. Pat. Nos. 4,756,973, 6,432, 544B1 and 6,506,488; photochromic polysilane coatings, such as those described in U.S. Pat. No. 4,556,605; photochromic poly(meth)acrylate coatings, such as those described in U.S. Pat. Nos. 6,602,603, 6,150,430 and 6,025, 026, and WIPO Publication WO 01/02449 A2; polyanhydride photochromic coatings, such as those described in U.S. Pat. No. 6,436,525; photochromic polyacrylamide coatings such as those described in U.S. Pat. No. 6,060,001; photochromic epoxy resin coatings, such as those described in U.S. Pat. Nos. 4,756,973 and 6,268,055B1; and photochromic poly(urea-urethane) coatings, such as those described in U.S. Pat. No. 6,531,076. The specifications of the aforementioned U.S. Patents and international publication are hereby specifically incorporated by reference herein.

As used herein the term "transitional coating" means a coating that aids in creating a gradient in properties between two coatings. For example, although not limiting herein, a transitional coating can aid in creating a gradient in hardness between a relatively hard coating and a relatively soft coating. Non-limiting examples of transitional coatings include radiation-cured acrylate-based thin films.

Non-limiting examples of protective coatings include abrasion-resistant coatings comprising organo silanes, abrasion-resistant coatings comprising radiation-cured acrylate-based thin films, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. For example, according to one non-limiting embodiment, the protective coating can comprise a first coating of a radiation-cured acrylate-based thin film and a second coating comprising an organo silane. Non-limiting examples of commercial protective coatings products include SILVUE® 124 and HI-GARD® coatings, available from SDC Coatings, Inc. and PPG Industries, Inc., respectively.

Another non-limiting embodiment of the present invention provides an ophthalmic element comprising at least one orientation facility on at least a portion of at least one exterior surface of the ophthahmic element, and an at least partial coating adapted to polarize at least transmitted radiation on at least a portion of the at least orientation facility. As used herein the term "orientation facility" means a mechanism that can facilitate the positioning of one or more other structures that are exposed to at least a portion of the facility, either directly, indirectly, of a combination, thereof.

Non-limiting examples of orientation facilities that can be used in conjunction with this and other non-limiting embodiments disclosed herein include at least partial coatings comprising an at least partially ordered alignment medium, at least partially stretched polymer sheets, at least partially treated surfaces, and combinations thereof.

For example, although not limiting herein, according to one non-limiting embodiment, the at least one orientation facility can comprise at least one at least partial coating comprising an at least partially ordered alignment medium. As used herein the term "alignment medium" means a material that can facilitate positioning of one or more other materials. Non-limiting methods of ordering at least a portion of the alignment medium are described below in detail.

Non-limiting examples of suitable alignment media that can be used in conjunction with various non-limiting embodiments disclosed herein include photo-orientation materials, rubbed-orientation materials, and liquid crystal materials. For example, according one non-limiting embodiment, the at least one orientation facility can comprise at least one at least partial coating comprising an at least partially ordered alignment medium chosen from photo-orientation materials, rubbed-orientation materials, and liquid crystal materials.

Non-limiting examples of liquid crystal materials suitable for use as an alignment medium in accordance with various non-limiting embodiments disclosed herein include liquid crystal polymers, liquid crystal pre-polymers, and liquid crystal monomers. For example, according to one non-limiting embodiment, the at least one orientation facility can comprise at least one at least partial coating comprising an at least partially ordered liquid crystal material chosen from liquid crystal polymers, liquid crystal pre-polymers, and liquid crystal monomers.

Liquid crystal monomers that are suitable for use as an alignment medium in conjunction with various non-limiting embodiments disclosed herein include mono-functional, as well as multi-functional, liquid crystal monomers. Further, according to various non-limiting embodiments disclosed herein, the liquid crystal monomer can be a cross-linkable liquid crystal monomer, and can further be a photocross-linkable liquid crystal monomer.

Non-limiting examples of cross-linkable liquid crystal monomers suitable for use as an alignment medium according to various non-limiting embodiments disclosed herein include liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Non-limiting examples of photocross-linkable liquid crystal monomers suitable for use as an anisotropic material according to various non-limiting embodiments disclosed herein include liquid crystal monomers having functional groups chosen from acrylates, methacrylates, alkynes, epoxides, thiols, and blends thereof.

Liquid crystal polymers and pre-polymers that are suitable for use as an alignment medium in conjunction with various non-limiting embodiments disclosed herein include thermotropic liquid crystal polymers and pre-polymers, and lyotropic liquid crystal polymers and pre-polymers. Further, the liquid crystal polymers and pre-polymers can be main-chain polymers and pre-polymers or side-chain polymers and pre-polymers. Additionally, according to various non-limiting embodiments disclosed herein, the liquid crystal polymer or pre-polymer can be cross-linkable, and further can be photocross-linkable.

Non-limiting examples of liquid crystal polymers and pre-polymers that are suitable for use as an alignment medium according to various non-limiting embodiments disclosed herein include, but are not limited to, main chain and side chain polymers and pre-polymers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Non-limiting examples of photocross-linkable liquid crystal polymers and pre-polymers that are suitable for use as an alignment medium according to various non-limiting embodiments disclosed herein include those polymers and pre-polymers having functional groups chosen from acrylates, methacrylates, alkynes, epoxides, thiols, and blends thereof.

Non-limiting examples of photo-orientation materials that are suitable for use as an alignment medium in conjunction with various non-limiting embodiments disclosed include photo-orientable polymer networks. Specific non-limiting examples of suitable photo-orientable polymer networks include azobenzene derivatives, cinnamic acid derivatives, coumarine derivatives, ferulic acid derivatives, and polyimides. For example, according one non-limiting embodiment, the orientation facility can comprise at least one at least partial coating comprising an at least partially ordered photo-orientable polymer network chosen from azobenzene derivatives, cinnamic acid derivatives, coumarine derivatives, ferulic acid derivatives, and polyimides. Specific non-limiting examples of cinnamic acid derivatives that can be used as an alignment medium in conjunction with various non-limiting embodiments disclosed herein include polyvinyl cinnamate and polyvinyl esters of paramethoxycinnamic acid.

As used herein the term "rubbed-orientation material" means a material that can be at least partially ordered by rubbing at least a portion of a surface of the material with another suitably textured material. For example, although not limiting herein, in one non-limiting embodiment, the rubbed-orientation material can be rubbed with a suitably textured cloth or velvet. Non-limiting examples of rubbed-orientation materials that are suitable for use as an alignment medium in conjunction with various non-limiting embodiments disclosed herein include (poly)imides, (poly)siloxanes, (poly)acrylates, and (poly)coumarines. Thus, for example, although not limiting herein, in one non-limiting embodiment, the at least partial coating comprising the alignment medium can be an at least partial coating comprising a polyimide that has been rubbed with velvet or a cloth so as to at least partially order at least a portion of the surface of the polyimide.

As discussed above, the at least one orientation facility according to various non-limiting embodiments disclosed herein can comprises an at least partially stretched polymer sheet. For example, although not limiting herein, a sheet of polyvinyl alcohol ("PVA") can be at least partially stretched, to at least partially order the PVA polymer chains, and thereafter the sheet can be bonded to the at least a portion of at least one exterior surface of the ophthalmic element to form the orientation facility.

Further, as discussed above, the at least one orientation facility according various non-limiting embodiments disclosed herein can comprise an at least partially treated surface. As used herein, the term treated surface refers to a surface that has been physically altered to impart an order to the surface. Non-limiting examples of at least partially treated surfaces include at least partially rubbed surfaces and at least partially etched surfaces. For example, according to one non-limiting embodiment, the at least one orientation facility comprises an at least partially treated surface chosen from at least partially rubbed surfaces and at least partially etched surfaces.

Non-limiting examples of etched surfaces that are useful in forming the orientation facility according to various non-limiting embodiments include, chemically etched surfaces, plasma etched surfaces, nanoetched surfaces (such as surfaces etched using a scanning tunneling microscope or an atomic force microscope), laser etched surfaces, and electron-beam etched surfaces.

Further, according various non-limiting embodiments, the at least one orientation facility can comprise a first ordered region having a first general direction and at least one second ordered region adjacent the first region having an second general direction that is different from the first general direction. Thus, the orientation facility can have a plurality of regions having various arrangements required to form a desired pattern or design. Additionally, as discussed above, one or more different orientation facilities can be combined to form the orientation facility according to the various non-limiting embodiments disclosed herein.

As previously discussed, according to various non-limiting embodiments, the at least partial coating adapted to polarize at least transmitted radiation can comprise at least one dichroic material. Non-limiting examples of suitable dichroic materials are set forth above in detail. Further, as previously discussed, it is generally necessary to at least partially align at least a portion of the at least one dichroic material to achieve a net polarization effect. Thus, according to various non-limiting embodiments, at least a portion of the at least one dichroic material can be at least partially aligned by direct contact with at least a portion of the orientation facility or by indirect contact with at least a portion of the orientation facility, for example, through one or more other structures or materials.

For example, in one non-limiting embodiment, at least a portion of the dichroic material can be at least partially aligned by direct contact with at least a portion of at least one orientation facility. Although not limiting herein, according to this non-limiting embodiment at least a portion of the at least one dichroic material can be at least partially aligned such that the long axis of the at least a portion of the at least one dichroic material is generally parallel to a general direction of at least one ordered region of the orientation facility. Further, although not limiting herein, according to this non-limiting embodiment, the orientation facility can comprise a liquid crystal material.

In another non-limiting embodiment the at least partial coating adapted to polarize at least transmitted radiation can comprise an anisotropic material and at least one dichroic material. Although not limiting herein, according to this non-limiting embodiment, at least a portion of the anisotropic material can be at least partially aligned with the at least one orientation facility and at least a portion of the at least one dichroic material can be at least partially aligned with the at least one at least partially aligned anisotropic material as previously discussed. Suitable non-limiting examples of anisotropic material are set forth above in detail.

Further, in addition to the at least one orientation facility and the at least partial coating adapted to polarize at least transmitted radiation, according to various non-limiting embodiments disclosed herein, the ophthalmic elements can comprise at least one at least partial coating comprising an alignment transfer material, and still further can comprise a plurality of at least partial coatings comprising an alignment transfer material. As used herein the term "alignment transfer material" means a material that can facilitate the propagation of a suitable arrangement or position from one structure or material to another.

For example, in one non-limiting embodiment, at least one at least partial coating comprising an alignment transfer material can be between the at least one orientation facility and the at least a portion of the at least partial coating adapted to polarize at least transmitted radiation. According to this non-limiting embodiment, at least a portion of the alignment transfer material can be aligned with at least a portion of the orientation facility, and at least a portion of the at least one dichroic material of the at least partial coating can be aligned with the at least a portion of the alignment transfer material. That is, the alignment transfer material can facilitate the propagation of a suitable arrangement or position from the at least one orientation facility to the at least one dichroic material. Further, if the at least partial coating adapted to polarize radiation comprises an anisotropic material, at least a portion of the anisotropic material can be at least partially aligned with the alignment transfer material and at least one dichroic material can be at least partially aligned with the at least one anisotropic material, as discussed above.

Non-limiting examples of alignment transfer materials that are suitable for use in conjunction with various non-limiting embodiments disclosed herein include liquid crystal materials chosen from liquid crystal polymers, liquid crystal pre-polymers, and liquid crystal monomer.

Liquid crystal monomers that are suitable for use as alignment transfer materials in conjunction with various non-limiting embodiments disclosed herein include monofunctional as well as multi-functional liquid crystal monomers. Further, according to various non-limiting embodiments disclosed herein, the liquid crystal monomer can be a cross-linkable liquid crystal monomer, and can further be a photocross-linkable liquid crystal monomer.

Non-limiting examples of cross-linkable liquid crystal monomers suitable for use as alignment transfer materials according to various non-limiting embodiments disclosed herein include liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers and blends thereof. Non-limiting examples of photocross-linkable liquid crystal monomers suitable for use as alignment transfer materials according to various non-limiting embodiments disclosed herein include liquid crystal monomers having functional groups chosen from acrylates, methacrylates, alkynes, epoxides, thiols, and blends thereof.

Liquid crystal polymers and pre-polymers that are suitable for use suitable for use as alignment transfer materials in conjunction with various non-limiting embodiments disclosed herein include, but are not limited to, thermotropic liquid crystal polymers and pre-polymers, and lyotropic liquid crystal polymers and pre-polymers. Further, the liquid crystal polymers and pre-polymers can be main-chain polymers and pre-polymers or side-chain polymers and pre-polymers. Additionally, according to various non-limiting embodiments disclosed herein, the liquid crystal polymer or pre-polymer can be cross-linkable, and further can be photocross-linkable.

Non-limiting examples of liquid crystal polymers and pre-polymers that are suitable for use as alignment transfer materials according to various non-limiting embodiments disclosed herein include, but are not limited to, main-chain and side-chain polymers and pre-polymers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Non-limiting examples of photocross-linkable liquid crystal polymers and pre-polymers that are suitable for use alignment transfer materials according to various non-limiting embodiments disclosed herein include those polymers and pre-polymers having functional groups chosen from acrylates, methacrylates, alkynes, epoxides, thiols, and blends thereof.

Further, the ophthalmic element according to various non-limiting embodiments disclosed herein can comprise one or more coatings that can facilitate bonding, adhering, or wetting of the at least a portion of at least one exterior surface of the ophthalmic element by the at least one orientation facility. For example, the ophthalmic element can further comprise an at least partial primer coating positioned between the at least one orientation facility and the at least a portion of the at least one exterior surface of the ophthalmic element. Non-limiting examples of primer coatings that can be suitable for use in conjunction with this non-limiting embodiment are discussed above in detail.

Still another non-limiting embodiment provides an ophthalmic element comprising at least one at least partial coating comprising an alignment medium on at least a portion of at least one exterior surface of the ophthalmic element, at least one at least partial coating comprising an alignment transfer material on at least a portion of the at least one at least partial coating comprising the alignment medium, and at least one at least partial coating comprising an anisotropic material and at least one dichroic material on at least a portion of the at least one at least partial coating comprising the alignment transfer material.

According to various non-limiting embodiments disclosed herein, the at least partial coating comprising the alignment medium can have an thickness that varies widely depending upon the final application and/or the processing equipment employed. For example, in one non-limiting embodiment, the thickness of the at least partial coating comprising the alignment medium can range from at least 2 nanometers to 10,000 nanometers. In another non-limiting embodiment, the at least partial coating comprising the alignment medium can have a thickness ranging from at least 5 nanometers to 1000 nanometers. In still another non-limiting embodiment, the at least partial coating comprising the alignment medium can have a thickness ranging from at least 10 nanometers to 100 nanometers. In yet another non-limiting embodiment, the at least partial coating comprising the alignment medium can have a thickness ranging from 50 nanometers to 100 nanometers. Additionally, according to various non-limiting embodiments, the ophthalmic element can comprise a plurality of at least partial coatings comprising an alignment medium. Further each of the plurality of at least partial coatings can have the same or a different thickness as the other at least partial coatings of the plurality.

Further, according to various non-limiting embodiments disclosed herein, the at least partial coating comprising the alignment transfer material can have a thickness that various widely depending upon the final application and/or the processing equipment employed. For example, in one non-limiting embodiment, the thickness of the at least partial coating comprising the at least one alignment transfer material can range from 0.5 microns to 25 microns. In another non-limiting embodiment, the at least partial coating comprising the alignment transfer material can have a thickness ranging from 5 to 10 microns. Additionally, according to various non-limiting embodiments, the ophthalmic element can comprise a plurality of at least partial coatings comprising an alignment transfer material. Further each of the plurality of at least partial coatings can have the same or a different thickness as the other at least partial coatings of the plurality.

Still further, according to various non-limiting embodiments disclosed herein, the at least partial coating comprising the anisotropic material and the at least one dichroic material can have a thickness that varies widely depending upon the final application and/or the processing equipment employed. In one non-limiting embodiment, the at least partial coating comprising the anisotropic material and the at least one dichroic material can have a thickness of at least 5 microns. Additionally, according to various non-limiting embodiments, the ophthalmic element can comprise a plurality of at least partial coatings comprising an anisotropic material and at least one dichroic material. Further each of the plurality of at least partial coatings can have the same or a different thickness as the other at least partial coatings of the plurality.

As previously discussed, in order to achieve a net polarization effect, at least a portion of the at least one dichroic material generally must be brought into suitable arrangement or position (i.e., ordered or aligned). Thus, although not limiting herein, according to various non-limiting embodiments, at least a portion of the alignment medium can be at least partially ordered in a first general direction, at least a portion of the alignment transfer material can be aligned with at least a portion of the alignment medium in a second general direction that is generally parallel to the first general direction, at least a portion of the anisotropic material can be at least partially aligned with at least a portion of the alignment transfer material in a third general direction that is generally parallel to the second general direction, and at least a portion of the at least one dichroic material can be at least partially aligned with at least a portion of the anisotropic material as previously discussed. That is, according to this non-limiting embodiment at least a portion of the dichroic material can be at least partially aligned such that the long axis of the at least a portion of the dichroic material is generally parallel to the third general direction of the at least partially aligned anisotropic material.

Further, according to various non-limiting embodiments disclosed herein, the at least partial coating comprising the alignment medium and/or the at least partial coating comprising the alignment transfer material can further comprise at least one dichroic material, which can be the same or different from at least one dichroic material of the at least partial coating comprising the anisotropic material and the at least one dichroic material. Additionally, any of the at least partial coatings discussed above can further comprise at least one photochromic material and/or at least one additive that can enhance at least one of the processing, the properties, or the performance of the at least partial coating, or combinations thereof. Non-limiting examples of suitable photochromic materials and additives are set forth above.

As previously discussed, the ophthalmic element according to various non-limiting embodiments disclosed herein can further comprise one or more coatings that can facilitate bonding, adhering, or wetting of the at least partial coating comprising the alignment medium to or on the at least a portion of the at least one exterior surface of the ophthalmic element and/or between two different at least partial coatings. For example, according to one non-limiting embodiment, an at least partial primer coating can be between the at least partial coating comprising the alignment medium and the at least a portion of the at least one exterior surface of the ophthalmic element. In another non-limiting embodiment, an at least partial primer coating can be between the at least partial coating comprising the alignment medium and the at least partial coating comprising the alignment transfer material and/or between the at least partial coating comprising the alignment transfer material and the at least partial coating comprising the at least one anisotropic material and the at least one dichroic material. Suitable non-limiting examples of primer coatings are set forth above in detail.

According to another non-limiting embodiment there is provided an the ophthalmic element comprising a substrate, at least one orientation facility comprising an at least partial coating comprising a photo-orientable polymer network on at least a portion of at least one exterior surface of the substrate, and an at least partial coating adapted to polarize at least transmitted radiation on at least a portion of the at least one at least partial coating comprising the photo-orientable polymer network. Further, according to this non-limiting embodiment, the at least partial coating adapted to polarize radiation comprises a liquid crystal material and at least one dichroic dye.

Additionally, according to the above-mentioned non-limiting embodiment, the at least partial coating comprising the photo-orientable polymer network can further comprise at least one dichroic dye, which can be the same or different from at least one dichroic dye of the at least partial coating comprising the liquid crystal material and the at least one dichroic dye. Further, any of the at least partial coatings can further comprise at least one photochromic material and/or at least one additive that can enhance at least one of the processing, the properties, or the performance of the at least partial coating. Non-limiting examples of suitable photochromic materials and additives are set forth above.

Further, the ophthalmic element according to this and other non-limiting embodiments disclosed herein can comprise an at least partial coating comprising an alignment transfer material between the at least partial coating comprising the photo-orientable polymer network and the at least partial coating adapted to polarize at least transmitted radiation. Non-limiting examples of suitable alignment transfer materials are set forth above.

Additionally, the ophthalmic element according to this non-limiting embodiment can further comprise one or more layers that can facilitate the at least partial coating comprising the photo-orientable polymer network bonding, adhering, or wetting the at least a portion of the at least one exterior surface of the substrate. For example, according to this non-limiting embodiment, an at least partial primer coating can be between the at least partial coating comprising the photo-orientable polymer network and the at least a portion of the at least one exterior surface of the substrate. Non-limiting examples of primer coatings that are suitable for use in conjunction with this non-limiting embodiment are set forth above.

Moreover, as discussed above, the ophthalmic element according to this and other non-limiting embodiments disclosed herein can further comprise at least one additional at least partial coating chosen from photochromic coatings, anti-reflective coatings, transitional coatings, primer coatings, and protective coatings on at least a portion of the substrate. Non-limiting examples of suitable photochromic coatings, anti-reflective coatings, transitional coatings, primer coatings, and protective coatings are set forth above.

As previous discussed, embodiments of the present invention contemplate optical elements and devices. For example, one non-limiting embodiment provides an optical element comprising an at least partial coating adapted to polarize at least transmitted radiation on at least a portion of at least one exterior surface of the optical element, the at least partial coating comprising an at least partially ordered liquid crystal material and at least one at least partially aligned dichroic material.

Another non-limiting embodiment provides an optical device comprising at least one optical element comprising an at least partial coating comprising an alignment medium on at least a portion of at least one exterior surface of the at least one optical element, and an at least partial coating comprising an anisotropic material and at least one dichroic material on at least a portion of the at least one at least partial coating comprising the alignment medium. Further, although not required, an at least partial coating comprising an alignment transfer material can be between at least a portion of the at least partial coating comprising the alignment medium and the at least partial coating comprising the anisotropic material and the at least one dichroic material. Optical elements, alignment media, alignment transfer materials, anisotropic materials, and dichroic materials that can be used in conjunction with this non-limiting embodiment are discussed above in detail.

Additionally, as previously discussed, according to the various non-limiting embodiments, the at least partial coating comprising the alignment medium and/or the at least partial coating comprising the alignment transfer material can further comprise at least one dichroic material, which can be the same or different from at least one dichroic material of the at least partial coating comprising the anisotropic material and the at least one dichroic material. Further, any of the at least partial coatings discussed above can further comprise at least one photochromic material and/or at least one additive that can enhance at least one of the processing, the properties, or the performance of the at least partial coating. Non-limiting examples of suitable photochromic materials and additives are set forth above.

Moreover, the optical elements according to various non-limiting embodiments disclosed herein can further comprise one or more layers that can facilitate bonding, adhering, or wetting of any of the coatings to or on least a portion of the at least one exterior surface of the optical element. For example, an at least partial primer coating can be between the at least partial coating comprising the alignment medium and the at least a portion of the at least one exterior surface of the optical element or it can be between the at least partial coating adapted to polarize at least transmitted radiation and at least a portion the exterior surface of the optical element or another coating. Non-limiting examples of primer coatings that are suitable for use in conjunction with this non-limiting embodiment are set forth above.

Additionally, as discussed above with respect to the foregoing non-limiting embodiments, optical elements according to this non-limiting embodiment can further comprise at least one additional at least partial coating chosen from photochromic coatings, anti-reflective coatings, transitional coatings, primer coatings, and protective coatings on at least a portion of the element. Non-limiting examples of suitable photochromic coatings, anti-reflective coatings, transitional coatings, and protective coatings are set forth above.

Further, although not limiting herein, according to various non-limiting embodiments disclosed herein, the optical device can be chosen from corrective and non-corrective eyewear, magnifying eyewear, clips-on lenses attachable to eyewear, and contact lenses.

Various non-limiting embodiments of methods of making polarizing devices and elements according to the present invention will now be described. One non-limiting embodiment provides a method of making an ophthalmic element comprising forming an at least partial coating adapted to polarize at least transmitted radiation on at least a portion of at least one exterior surface of the ophthalmic element.

Although not limiting herein, according this non-limiting embodiment, forming the at least partial coating adapted to polarize at least transmitted radiation can comprise applying an at least partial coating comprising at least one dichroic material and at least one anisotropic material to at least a portion of at least one exterior surface of the ophthalmic element and at least partially aligning at least a portion of the at least one dichroic material. As previously discussed, by bringing at least a portion of the at least one dichroic material into suitable position or arrangement, a net polarization effect can be achieved. Non-limiting examples of dichroic materials and anisotropic materials suitable for use in conjunction with this and other non-limiting embodiments of methods of making ophthalmic elements disclosed herein are set forth above.

Non-limiting examples of methods of applying at least partial coatings that can be used in conjunction with the methods of making ophthalmic and optical elements according to various non-limiting embodiments disclosed herein include, but are not limited to: spin coating, spray coating, spray and spin coating, curtain coating, flow coating, dip coating, injection molding, casting, roll coating, wire coating and methods used in preparing overlays, such as the method of the type described in U.S. Pat. No. 4,873,029. Generally, the application method selected will depend upon, among other things, the thickness of the desired coating, the geometry of the surface to which the coating is applied, and the viscosity of the coating.

Further, according to various non-limiting embodiments disclosed herein, applying the at least partial coating comprising the at least one dichroic material and the at least one anisotropic material can occur before, after, or at essentially the same time as at least partially aligning at least a portion of the at least one dichroic material.

For example, in one non-limiting embodiment wherein applying the at least partial coating comprising the at least one dichroic material and the at least one anisotropic material occurs before at least partially aligning at least a portion of the at least one dichroic material, the method of forming the at least partial coating can comprise spin coating the at least partial coating onto at least a portion of at least one exterior surface of the ophthalmic element. Thereafter, at least a portion of the at least one anisotropic material can be at least partially ordered and at least a portion of the at least one dichroic material can be at least partially aligned with the at least partially ordered anisotropic material, for example by exposing at least a portion of the at least partial coating to at least one orientation facility after applying the at least partial coating.

In another non-limiting embodiment, wherein applying the at least partial coating comprising the at least one dichroic material and the at least one anisotropic material occurs at essentially the same time as at least partially aligning at least a portion of the at least one dichroic material, applying the at least partial coating can comprise coating the at least partial coating onto the at least a portion of the at least one exterior surface of the ophthalmic element such that, during coating, at least a portion of the anisotropic material is at least partially ordered and at least a portion of the at least one dichroic material is at least partially aligned with the at least partially ordered anisotropic material. For example, although not limiting herein, at least a portion of the anisotropic material can be at least partially ordered during coating due to the shear forces created by the relative movement of the exterior surface of the ophthalmic element with respect to the coating being applied. Non-limiting methods of coating according to this non-limiting embodiment include, but are not limiting to, curtain coating.

Additionally, according to various non-limiting embodiments disclosed herein, forming the at least partial coating adapted to polarize at least transmitted radiation can comprise forming a plurality of at least partial coatings on the at least a portion of the at least one exterior surface of the ophthalmic element, at least one of which is adapted to polarize at least transmitted radiation. For example, although not limiting herein, according to one non-limiting embodiment forming the at least partial coating adapted to polarize at least transmitted radiation can comprise forming a first at least partial coating comprising an alignment medium and at least partially ordering at least a portion of the alignment medium, forming a second at least partial coating comprising an alignment transfer material and at least partially aligning at least a portion of the alignment transfer material, and forming a third at least partial coating comprising at least one anisotropic material and at least one dichroic material and at least partially aligning at least a portion of the at least one dichroic material. Additionally, according to this non-limiting embodiment, any one of the first and second at least partial coatings can further comprise at least one dichroic material. Further, any one of the first, second, or third at least partial coatings can comprise at least one of a photochromic material, and/or an additive that can enhance the processing, properties, or performance of the at partial coating. Non-limiting examples of suitable dichroic materials, photochromic materials and additives are set forth above in the discussion of the various non-limiting embodiments of elements and devices.

The method of making ophthalmic elements according to various non-limiting embodiments disclosed herein can further comprise at least partially setting at least a portion of one or more of the at least partial coatings after forming the at least partial coating on the at least a portion of the element. As used herein the term "set" means fix in a desired position. For example, in one non-limiting embodiment, at least a portion of the at least partial coating adapted to polarize at least transmitted radiation can be at least partially set after forming the at least partial coating on at least a portion of at least one exterior surface of the ophthalmic element. Although not limiting herein, according to various non-limiting embodiments disclosed herein, at least partially setting at least a portion of an at least partial coating can comprise at least one of at least partially curing, at least partially cross-linking, or at least partially drying the at least a portion of the at partial coating.

Further, according to various non-limiting embodiments disclosed herein, at least partially setting at least a portion of an at least partial coating can comprise at least partially curing the at least a portion by exposing the at least a portion of the at least partial coating to infrared, ultraviolet, gamma or electron radiation so as to initiate the polymerization reaction of the polymerizable components or cross-linking with or without a catalyst or initiator. This can be followed by a heating step, if appropriate.

In one non-limiting embodiment wherein the at least partial coating comprises at least one photocross-linkable material, such as a photocross-linkable liquid crystal material, at least partially setting can include at least partially cross-linking the photocross-linkable material by exposing the material to appropriate actinic radiation. For example, although not limiting herein, at least partially setting an at least partial coating comprising a photocross-linkable material can comprise exposing at least a portion of the photocross-linkable material to ultraviolet radiation in an essentially inert atmosphere. As used herein, the term "essentially inert atmosphere" means an atmosphere having limited reactivity the material being cured. For example, in one non-limiting embodiment, the essentially inert atmosphere comprises no greater than 100 ppm of $O_2$ gas. Examples of suitable essentially inert atmospheres include, but are not limited to, atmosphere containing nitrogen, argon, and carbon dioxide.

The methods of making the ophthalmic elements according to various non-limiting embodiments disclosed herein can further comprise applying an at least partial primer coating to at least a portion of the at least one exterior surface of the ophthalmic element prior to applying the at least partial coating adapted to polarize at least transmitted radiation. Moreover, although not limiting herein, at least one additional at least partial coating chosen from photochromic coatings, anti-reflective coatings, transitional coatings, primer coatings, and protective coatings can be applied to at least a portion of at least one exterior surface of the ophthalmic element either before or after applying the at least partial coating adapted to polarize at least transmitted radiation. Non-limiting examples of suitable primer coatings, photochromic coatings, anti-reflective coatings, transitional coatings, and protective coatings are described above in detail.

Additionally, if appropriate, the methods according to various non-limiting embodiments disclosed herein can further comprise cleaning at least a portion of the ophthalmic element or substrate prior to applying any coatings thereto. This can be done for the purposes of cleaning and/or promoting adhesion of the coating. Effective treatment techniques for plastics and glass are known to those skilled in the art.

As discussed above, according to one non-limiting embodiment there is provided a method of making an ophthalmic element comprising forming an at least partial coating adapted to polarize at least transmitted radiation on at least a portion of at least one surface of the ophthalmic element. Additionally, according to this non-limiting embodiment, the method can further comprising imparting at least one orientation facility to the least a portion of the at least one exterior surface of the ophthalmic element prior to forming the at least partial coating adapted to polarize at least transmitted radiation thereon. According to this non-limiting embodiment, imparting the at least one orientation facility to the at least a portion of the at least one exterior surface of the ophthalmic element can comprise at least one of applying an at least partial coating comprising an alignment medium to the at least a portion of the at least one exterior surface of the ophthalmic element and at least partially ordering at least a portion of the alignment medium, applying an at least partially stretched polymer sheet to the at least a portion of the at least one exterior surface of the ophthalmic element, and at least partially treating at least a portion of the at least one exterior surface of the ophthalmic element, for example, but not limited to, by etching or rubbing.

Still another non-limiting embodiment of a method of making an ophthalmic element comprises imparting at least one orientation facility comprising an at least partial coating comprising an alignment medium to at least a portion of at least one exterior surface of the ophthalmic element, applying at least one dichroic material to at least a portion of the at least one orientation facility, and at least partially aligning at least a portion of the at least one dichroic material.

According to this non-limiting embodiment, imparting the at least one orientation facility to the at least a portion of the at least one exterior surface of the ophthalmic element can comprise applying an at least partial coating comprising an alignment medium to the at least a portion of the at least one exterior surface of the ophthalmic element and at least partially ordering at least a portion of the alignment medium. For example, although not limiting herein, imparting the at least one orientation facility can comprise applying an at least partial coating comprising an alignment medium to at least a portion of at least one exterior surface of the ophthalmic element and at least partially ordering at least a portion of the alignment medium. Non-limiting examples of alignment media that are suitable for use in conjunction with the various non-limiting embodiments of methods disclosed herein are set forth above.

Non-limiting examples of methods of at least partially ordering at least a portion of the alignment medium that can be used in conjunction with the methods of making ophthalmic elements according to various non-limiting embodiments disclosed herein include at least one of exposing the at least a portion of the alignment medium to plane-polarized ultraviolet radiation; exposing the at least a portion of the alignment medium to infrared radiation; exposing the at least a portion of the alignment medium to a magnetic field; exposing the at least a portion of the alignment medium to an electric field; drying the at least a portion of the alignment medium; etching the at least a portion of the alignment medium; exposing the at least a portion of the alignment medium to a shear force; and rubbing the at least a portion of the alignment medium.

For example, although not limiting herein, according to one non-limiting embodiment, wherein the alignment medium is a photo-orientation material (such as, but not limited to a photo-orientable polymer network) the method of making an ophthalmic element can comprise applying an at least partial coating comprising a photo-orientation material to at least a portion of at least one exterior surface of the ophthalmic element and at least partially ordering at least a portion of the photo-orientation material by exposing the at least a portion to plane-polarize ultraviolet radiation. Thereafter, the at least one dichroic material can be applied to at least a portion of the at least partially ordered photo-orientation material and at least partially aligned.

Further, if required, imparting the at least one orientation facility can further comprise at least partially setting at least a portion of the at least one orientation facility. As discussed above, at least partially setting can include least partially curing, at least partially cross-linking, or at least partially drying at least a portion of the at least one orientation facility. For example, although not limiting herein, the method according to one non-limiting embodiment disclosed herein can comprise imparting at least one orientation facility to at least a portion of at least one exterior surface of an ophthalmic element by applying an at least partial coating comprising an alignment medium to at least a portion of at least one exterior surface of the ophthalmic element, at least partially setting at least a portion of the alignment medium, and at least partially ordering at least a portion of the alignment medium prior to applying the at least one dichroic material.

Non-limiting examples of methods of applying the at least one dichroic material to at least a portion of the at least one orientation facility comprising the at least partial coating comprising the alignment medium according to the various non-limiting embodiments disclosed herein include those methods discussed above for applying at least partial coatings. For example, although not limiting herein, methods of applying the at least one dichroic material can include spin coating, spray coating, spray and spin coating, curtain coating, flow coating, dip coating, injection molding, casting, roll coating, wire coating and methods used in preparing overlays, such as the method of the type described in U.S. Pat. No. 4,873,029.

Additionally, the at least one dichroic material can be applied to at least a portion of the at least one orientation facility comprising the at least partial coating comprising the alignment medium by imbibing. Suitable imbibition techniques are described, for example, U.S. Pat. Nos. 5,130,353 and 5,185,390, which are specifically incorporated by reference herein. For example, although not limiting herein, the dichroic material can be applied to at least a portion of the at least one orientation facility by applying the at least one dichroic material to at least a portion of the orientation facility, either as the neat dichroic material or dissolved in a polymeric or other organic solvent carrier, and then subjecting the dichroic material and the orientation facility to heat to cause the at least one dichroic material to diffuse into at least a portion of the orientation facility.

Further, according to various non-limiting embodiments disclosed herein, applying the at least one dichroic material to at least a portion of the at least one orientation facility can occur before aligning the at least one dichroic material, after aligning the at least one dichroic material, or at essentially the same time as aligning the at least one dichroic material. For example, although not limiting herein, in one non-limiting embodiment, the at least one dichroic material can be applied prior to aligning by spin coating on a solution or mixture of the at least one dichroic material and a liquid crystal polymer in a carrier onto the at least a portion of the orientation facility, and thereafter evaporating at least a portion of the solvent or carrier to align at least a portion of the liquid crystal polymer and at least a portion of the at least one dichroic material. In another non-limiting embodiment, the at least one dichroic material can be applied and aligned at essentially the same time, for example, by imbibing at least a portion of the orientation facility with the at least one dichroic material. Methods of imbibing are discussed above in detail.

According to various non-limiting embodiments disclosed herein, the at least one dichroic material can be applied to the at least one orientation facility as a solution or mixture with a carrier, or together with one or more other materials, such as anisotropic materials, photochromic materials, and additives that can improve at least one of the processing, properties, or performance of the material applied. Non-limiting examples of suitable anisotropic materials, photochromic materials, and additives are set forth with respect to the various non-limiting embodiments of elements and devices discussed above.

Additionally, the methods of making ophthalmic elements according to various non-limiting embodiments disclosed herein can further comprise applying an at least partial primer coating to the at least a portion of the at least one exterior surface of the ophthalmic element prior to imparting the at least one orientation facility to the at least a portion of the exterior surface. Moreover, at least one additional at least partial coating chosen from photochromic coatings, anti-reflective coatings, transitional coatings, primer coatings, and protective coatings can be applied to at least a portion of at least one exterior surface of the ophthalmic element and/or over at least a portion of the at least one dichroic material. Non-limiting examples of suitable primer coatings, photochromic coatings, anti-reflective coatings, transitional coatings, and protective coatings are all described above.

Another non-limiting embodiment provides a method of making an ophthalmic element comprising applying an at least partial coating to at least a portion of at least one exterior surface of the ophthalmic element and adapting at least a portion of the at least partial coating to polarize at least transmitted radiation. According to this non-limiting embodiment, applying the at least partial coating to the at least a portion of the at least one exterior surface of the ophthalmic element can occur before, after, or at essentially the same time as adapting the at least a portion of the at least partial coating to polarize at least transmitted radiation.

For example, although not limiting herein, according to one non-limiting embodiment, applying the at least partial coating to the at least a portion of the at least one exterior surface of the ophthalmic element can comprise applying an at least partial coating comprising an anisotropic material and at least one dichroic material to the at least a portion of the at least one exterior surface; and adapting at least a portion of the at least partial coating to polarize at least transmitted radiation can comprise at least partially aligning at least a portion of the at least one dichroic material. Further, at least partially aligning at least a portion of the at least one dichroic material can comprise at least partially ordering at least a portion of the anisotropic material and at least partially aligning the at least one dichroic material with at least a portion of the at least partially ordered anisotropic material.

Suitable methods of at least partially ordering at least a portion of the anisotropic material include, but are not limited to, at least one exposing of the anisotropic material to plane-polarized ultraviolet radiation, exposing the at least a portion of the anisotropic material to infrared radiation, exposing the at least a portion of the anisotropic material to a magnetic field, exposing the at least a portion of the anisotropic material to an electric field, drying the at least a portion of the anisotropic material, etching the at least a portion of the anisotropic material, exposing the at least a portion of the anisotropic material to a shear force, rubbing the at least a portion of the anisotropic material, and aligning at least a portion of the anisotropic material with another structure or material, such as, but not limited to, an at least partially ordered alignment medium.

In another non-limiting embodiment, applying the at least partial coating to the at least a portion of at least one exterior surface of the ophthalmic element comprises applying an at least partial coating comprising an alignment medium to the at least a portion of the at least one exterior surface of the ophthalmic element, and adapting at least a portion of the at least partial coating to polarize at least transmitted radiation comprises at least partially ordering at least a portion of the alignment medium, applying at least one dichroic material to at least a portion of the at least partial coating comprising the alignment medium, and at least partially aligning at least a portion of the at least one dichroic material.

Non-limiting examples of alignment media that are suitable for use in conjunction with various non-limiting embodiments of methods disclosed herein include those alignment media previous described with respect to the various non-limiting embodiments discussed above. For example, according to one non-limiting embodiment, wherein applying the at least partial coating to the at least a portion of at least one exterior surface of the ophthalmic element comprises applying an at least partial coating comprising an alignment medium to the at least a portion of the at least one exterior surface of the ophthalmic element, the alignment medium can be chosen from photo-orientation materials, rubbed-orientation materials, and liquid crystal materials.

Further according to various non-limiting embodiments at least partially ordering at least a portion of the alignment medium can comprise at least one exposing of the alignment medium to plane-polarized ultraviolet radiation, exposing the at least a portion of the alignment medium to infrared radiation, exposing the at least a portion of the alignment medium to a magnetic field, exposing the at least a portion of the alignment medium to an electric field, drying the at least a portion of the alignment medium, etching the at least a portion of the alignment medium, exposing the at least a portion of the alignment medium to a shear force, and rubbing the at least a portion of the alignment medium.

For example, although not limiting herein, according to one non-limiting embodiment wherein the alignment medium is a photo-orientation material (such as, but not limited to, a photo-orientable polymer network), at least partially ordering at least a portion of the photo-orientation material can comprise exposing at least a portion of the photo-orientation material to plane-polarized ultraviolet radiation.

Further, according to certain non-limiting embodiments wherein adapting at least a portion of the at least partial coating to polarize at least transmitted radiation comprises applying at least one dichroic material to at least a portion of the at least partial coating comprising an at least partially ordered alignment medium and at least partially aligning at least a portion of the at least one dichroic material, applying the at least one dichroic material can occur before, after, or at essentially the same time as at least partially aligning at least a portion of the at least one dichroic material. Non-limiting methods of applying the at least one dichroic material to the at least a portion of the at least partial coating comprising the alignment medium include spin coating, spray coating, spray and spin coating, curtain coating, flow coating, dip coating, injection molding, casting, roll coating, wire coating and methods used in preparing overlays, such as the method of the type described in U.S. Pat. No. 4,873,029, and imbibing.

The methods of making the ophthalmic elements according to various non-limiting embodiments disclosed herein can further comprise applying an at least partial primer coating to at least a portion of the at least one exterior surface of the ophthalmic element prior to forming and adapting the at least partial coating to polarize at least transmitted radiation. Additionally, the methods of making the ophthalmic elements can further comprise applying at least one additional at least partial coating chosen from photochromic coatings, anti-reflective coatings, transitional coatings, primer coatings, and protective coatings to at least a portion of the ophthalmic elements. For example, although not limiting herein, the at least one additional at least partial coating can be applied over at least a portion of the at least partial coating that is adapted to polarize at least transmitted radiation. Alternatively, or additionally, the at least partial coating adapted to polarize at least transmitted radiation can be formed on at least a portion of a first exterior surface of the ophthalmic element and the at least one additional at least partial coating can be applied to at least a portion of a second exterior surface of the ophthalmic element, wherein the first exterior surface of the ophthalmic element is opposite the second exterior surface of the ophthalmic element. Non-limiting examples of such coatings are described above in detail.

Another non-limiting embodiment of a method of making an ophthalmic element comprises applying an at least partial coating comprising an alignment medium to at least a portion of at least one exterior surface of the ophthalmic element and at least partially ordering at least a portion of the alignment medium. Thereafter, according to this non-limiting embodiment, an at least partial coating comprising an anisotropic material and at least one dichroic material is applied to at least a portion of at least partial coating comprising the alignment medium and at least a portion of the at least one dichroic material is at least partially aligned. Although not required, at least one at least partial coating comprising an alignment transfer material can be applied to at least a portion of the at least partial coating comprising the alignment medium and at least partially aligning prior to applying the at least partial coating comprising the anisotropic material and the at least one dichroic material thereto.

According to this non-limiting embodiment, at least partially ordering at least a portion of the alignment medium can comprise at least one of exposing the at least a portion of the alignment medium to plane-polarized ultraviolet radiation, exposing the at least a portion of the alignment medium to infrared radiation, exposing the at least a portion of the alignment medium to a magnetic field, exposing the at least a portion of the alignment medium to an electric field, drying the at least a portion of the alignment medium, etching the at least a portion of the alignment mediums, exposing the at least a portion the alignment medium to a shear force, and rubbing the at least a portion of the alignment medium.

Further, although not limiting herein, as previously discussed, any of the at least partial coatings described above can be at least partially set after being applied. For example, according to one non-limiting embodiment, at least a portion of the at least partial coating comprising the alignment medium can be at least partially set prior, during, or after at least partially ordering the at least a portion of the alignment medium. Further, according to this non-limiting embodiment, at least a portion of the at least partial coating comprising the alignment transfer material and/or the at least partial coating comprising the anisotropic material and the at least one dichroic material can be at least partially set by curing at least a portion of the at least partial coating. For example, at least a portion of the alignment transfer material can be exposed to ultraviolet radiation under an inert atmosphere to cure the at least a portion of the alignment transfer material. Similarly, at least a portion of the at least partial coating comprising the anisotropic material and the at least one dichroic material can be cured by exposing at least a portion of the anisotropic material to ultraviolet radiation under an inert atmosphere after at least partially aligning at least a portion of the at least one dichroic material.

Another non-limiting embodiment of the invention provides a method of making a lens for ophthalmic applications comprising applying an at least partial coating comprising a photo-orientable polymer network to at least a portion of at least one exterior surface of the lens, at least partially ordering at least a portion of the photo-orientable polymer network with plane-polarized ultraviolet radiation. Thereafter, an at least partial coating comprising a liquid crystal material and at least one dichroic dye is applied to at least a portion of the at least partial coating comprising the photo-orientable polymer network and the at least one dichroic dye is at least partially aligned. After aligning the at least a portion of the coating comprising the liquid crystal material and the at least one dichroic dye, at least a portion of the coating comprising the liquid crystal material and the at least one dichroic dye can be at least partially set, for example although not limiting herein, by curing. Although not required, an at least partial coating comprising an alignment transfer material can be applied to at least a portion of the at least partial coating comprising the photo-orientable polymer network prior to applying the at least partial coating comprising the liquid crystal material and the at least one dichroic dye thereto.

Other embodiments of the invention provide methods of making an optical element comprising applying an at least partial coating to at least a portion of at least one exterior surface of the optical element, and adapting at least a portion of the at least partial coating to polarize radiation. Suitable methods of applying an at least partial coating and adapting at least a portion of the at least partial coating to polarize radiation are described above in detail.

Various non-limiting embodiments of the present invention will now be illustrated in the following, non-limiting examples.

EXAMPLES

Step 1

Preparation of Solutions of Anisotropic Materials

To a beaker containing a magnetic stir bar and positioned on a magnetic stirrer was added 3 grams of each of the following liquid crystal monomers ("LCM"), which are available from EMD Chemicals, Inc., in the order listed with stirring:

RM 23—reported to have the molecular formula of $C_{23}H_{23}NO_5$
RM 257—reported to have the molecular formula of $C_{33}H_{32}O_{10}$
RM 82—reported to have the molecular formula of $C_{39}H_{44}O_{10}$
RM 105—reported to have the molecular formula of $C_{23}H_{26}O_6$ Anisole (8.0 grams) was added to the contents in the beaker and the resulting mixture was heated to 60° C. and stirred until the solids were dissolved as determined by visual observation. The resulting liquid crystal monomer solutions (or "LCMS") were divided into two portions, "Portion A-LCMS" and "Portion B-LCMS." A beaker containing Portion A-LCMS was placed uncovered in a fume hood on a balance until the percent solids increased from the initial 60 percent to 62 percent. Portion B-LCMS had 60 percent solids.

Step 2

Preparation of Stock Solutions of Anisotropic Materials and Dichroic Materials

The following three dichroic dyes, which are available from Mitsubishi Chemical, were used to prepare individual dichroic dye-colored liquid crystal monomer solutions (i.e., Red-, Blue-, Yellow-or Gray-LCMS):
LSR-652 reported to be a red dye of Lot: 01J0315;
LSR-335 reported to be a blue dye of Lot: 01C131; and
LSR-120 reported to be a yellow dye of Lot: 2D231.

Each of the Red-LCMS, Blue-LCMS, and Yellow-LCMS was prepared by adding to the Portion A-LCMS (prepared in Step 1) the amount of dichroic dye necessary to produce a dichroic dye-colored LCMS having the percent dichroic dye, based on the solids of the Portion A-LCMS, listed for each below. The Gray-LCMS was prepared using Portion B-LCMS from Step 1 and adding to it the combination of dichroic dyes listed below in the amounts necessary to result in the percent dye, based on the solids of Portion B-LCMS, listed below.

| Dye-Colored LCMS | Dichroic Dye | Percent Dichroic Dye |
|---|---|---|
| Red-LCMS | LSR652 | 2.0 |
| Blue-LCMS | LSR335 | 3.0 |
| Yellow-LCMS | LSR120 | 2.5 |
| Gray-LCMS | LSR652 | 0.8 |
|  | LSR335 | 1.1 |
|  | LSR120 | 0.6 |

The individual Red-LCMS, Blue-LCMS and Yellow-LCMS also contained 1.0 percent, based on the solids of Portion A-LCM, of Irgacure 819, a photoinitiator that is available from Ciba-Geigy Corporation; and 0.5 percent, based on the solids of Portion A-LCMS, of a combination of stabilizers in a 50:50 weight ratio. The stabilizers were TINUVIN-292, a light stabilizer for coatings from Ciba-Geigy, and SANDUVOR VSU, a light stabilizer based on oxalanilide chemistry available from Clariant. The Gray-LCMS contained 1.0 percent, based on the solids of Portion B-LCMS, each of Irgacure 819 and the aforementioned combination of stabilizers.

Step 3

Preparation of Coating Solutions Comprising Anisotropic Materials and Dichroic Materials Coating solutions comprising anisotropic materials and dichroic materials were prepared by adding the stock dichroic dye-colored LCMS from Step 2, in the amounts indicated, as weighed on an analytical balance, in the following Examples 1–5 to a beaker and mixing with heating to 50–60° C., if necessary, to prevent the liquid crystal monomer from precipitating and to dissolve the dye. An additional coating solution, Example 6, used the Gray-LCMS prepared above in Step 2, and was also heated with mixing as required. After mixing, each of the solutions were filtered using a syringe filter having a pore size of 1.2 microns to remove any particulate matter.

Example 1

| Material | Weight of Material (grams) |
|---|---|
| Red Dye Solution | 0.6008 |
| Blue Dye Solution | 1.2772 |
| Yellow Dye Solution | 0.5049 |

Example 2

| Material | Weight of Material (grams) |
|---|---|
| Red Dye Solution | 0.5415 |
| Blue Dye Solution | 0.8892 |
| Yellow Dye Solution | 0.3501 |

Example 3

| Material | Weight (grams) |
|---|---|
| Red Dye Solution | 0.5410 |
| Blue Dye Solution | 0.8880 |
| Yellow Dye Solution | 0.3945 |

Example 4

| Material | Weight (grams) |
|---|---|
| Red Dye Solution | 0.3939 |
| Blue Dye Solution | 0.6460 |
| Yellow Dye Solution | 0.3272 |

Example 5

| Material | Weight (grams) |
|---|---|
| Red Dye Solution | 0.3758 |
| Blue Dye Solution | 0.4908 |
| Yellow Dye Solution | 0.2832 |

Each of the aforementioned coating solutions were used in the procedure described hereinafter in Parts A–D, to prepare at least partial coatings adapted to polarize at least transmitted radiation on the surface a substrate. After preparation, the absorption ratio of each of the coated substrates was measured in the Absorption Ratio Measurement Test described in Part E.

Part A

Substrate Cleaning

Square substrates measuring 2 inches by 2 inches by 0.25 inch (5.08 cm by 5.08 cm by 0.635 cm) were obtained from following: CR-39® monomer or TRIVEX® 151 lens material, both of which are available from PPG Industries, Inc.; 70 mm diameter plano lenses of CR-607® monomer, which is available from PPG Industries, Inc.; and photochromic lenses form Transitions Optical Incorporated with a refractive index of 1.50. Thereafter, each substrate was cleaned by washing in a solution of liquid soap and water, rinsing with deionized water, and rinsing with isopropyl alcohol. After washing and rinsing, the substrates were dried and treated with oxygen plasma at a flow rate of 100 milliliters (mL) per minute of oxygen at 100 watts of power for one minute.

As indicated in Part D and Table 1 below, some of the substrates were further treated with the a primer coating described in U.S. Pat. No. 6,150,430. More specifically, these substrates were treated by dispensing the primer coating composition for 10 seconds to the substrates while the substrate was spinning at 1500 rpm. The coated substrates were then cured in a Light-Welder® 5000-EC UV light source from Dymax Corp., at a distance of 4 inches from the light for 10 seconds.

Part B

Preparation of Orientation Facility Using a Photo-Orientable Polymer Network

An orientation facility was imparted to a portion of the cleaned substrates (described in Part A above) as follows. A solution of a photo-orientable polymer network available as Staralign® 2200 CP2 or CP4 solution, which designations are reported to mean 2 weight percent in cyclopentane and 4 weight percent in cyclopentane, respectively, from Huntsman Advanced Materials, was applied on a portion of the surface of the substrate prepared in Part A by dispensing the Staralign solution for 2 to 3 seconds onto the substrate. As the Staralign solution was dispensed onto the substrate, the substrate was spun at 600 to 800 revolutions per minute for about 2 to 3 minutes. After coating, the substrates were placed in an oven maintained at 130° C. for 20 to 30 minutes. With reference to Table 1 below, the Staralign 2200 CP2 solution was used on Samples 6A1 and 6A2. All others samples, except 6A(magnetic) were coated with the Staralign 2200 CP4.

At least a portion of the photo-orientable polymer network was at least partially ordered by exposure to plane-polarized ultraviolet radiation, at a peak intensity of 18 milliWatts/cm² of UVA (320–390 nm) as measured using a UV Power Puck™ electro-optic radiometer from Electronic Instrumentation and Technology, Inc. The source of the ultraviolet radiation was a BLAK-RAY Model B-100A Longwave UV Lamp. Again, with reference to Table 1, Samples 1A to 6D, were exposed to the plane-polarized ultraviolet radiation for 2 minutes, Samples 6A1 and 6A2 were exposed to the plane-polarized ultraviolet radiation for 3 minutes.

Part C

Preparation of at least Partial Coatings Adapted to Polarize at least Transmitted Radiation At least partial coatings adapted to polarize at least transmitted radiation were then formed on each of the substrates prepared in Part B using one of the dichroic dye-colored LCMS described above in Examples 1–6 of Step 3.

The dichroic dye-colored LCMS was applied to at least a portion of the orientation facility on the surface of the substrate by spin coating. More specifically, approximately 1 mL of the dichroic dye-colored LCMS was dispensed onto the substrate and the excess dichroic dye-colored LCMS, if any, was drained off. Thereafter, the substrate was spun at 300 to 400 revolutions per minute for 4 to 6 minutes. After spin coating, the substrate was placed in a 45° C. to 55° C. oven for 20 to 40 minutes to permit at least a portion of the LCM and at least a portion of the dichroic dye to align.

Thereafter, the resultant coatings were tested for alignment using two cross-polarized polarizing films (#45669) from Edmund Industrial Optics. Each coated substrate was positioned between the cross-polarized polarizing films so that the coated substrate was parallel with at least one of the films such that the visible light transmitted through the configuration of the polarizing films and the coated substrate was reduced. At least partial alignment was verified by observing an increase in the transmitted visible light when one of the polarizing films was rotated 45 degrees clockwise or counterclockwise while viewing a visible light source through the configuration. When two at least partial coatings of the dichroic dye colored-LCMS were applied, the aforementioned steps of this Part C were completed prior to the application of the second at least partial coating.

After verifying at least partial alignment of the coatings, the at least partial coatings were further cured by covering each of the coated substrates with a 6-base polycarbonate plano lens having a diameter of 70 mm and thickness of 2.0 mm so that it was about 1 mm to 2 mm above the surface of the coated substrate. The resulting polycarbonate lens/coated substrate assembly was placed on an ultraviolet conveyor curing line obtained from Eye Ultraviolet, Inc. The UV conveyor curing line had a nitrogen atmosphere in which the oxygen level was less than 100 ppm. The conveyor traveled three feet per minute beneath two ultraviolet "type D" 400 watt/inch iron iodide doped mercury lamps of 10 inches in length. One of the lamps was positioned 2.5 inches above the conveyor and the other lamp was positioned 6.5 inches above the conveyor. The peak intensity of different ultraviolet wavelengths provided by the ultraviolet conveyor curing line was measured using a UV Power Puck™ electro-optic radiometer, described hereinbefore. The peak intensity of UVA (320 to 390 nm) measured was 0.239 Watts/cm² and of UVV (395 to 445 nm) measured was 0.416 Watts/cm².

Part D

Preparation of at least Partial Coatings Adapted to Polarize at least Transmitted Radiation Using a Magnetic Field The square substrates of polymerizates of CR39® monomer lens material coated with the primer coatings as described in Part A were used to prepare coated samples in this Part D. However, as described below, the substrates were not prepared according to Part B prior to coating with the Gray-LCMS.

For the samples prepared according to this Part D, the procedure of Part C was generally followed to coat the primer-coated substrates (described in above in Part A) with the Gray-LCMS of Example 6 (described above in Step 3), except prior to curing the coated substrate, at least a portion of the coating was at least partially ordered as follows. The coated substrate was placed on a temperature controlled hot plate 8 inches beneath a temperature controlled infrared lamp and between the North and South poles of a 0.35 Tesla magnet that were separated by a distance of 11 centimeters. Both temperature controllers were set to maintain a temperature of from approximately 55° C. to 60° C. The coated substrate was kept under these conditions for 40 to 45 minutes to at least partially order the LCM and the dichroic dye. Thereafter, the ordered coating was cured and the ordering of the coating was verified as described in Part C (with respect to the aligned coatings). The resulting sample is identified as 6A(Magnetic) in Table 1.

Part E

Absorption Ratio Measurement Tests

Absorption ratios for each coated substrates were determined as follows. A CARY 4000 UV-Visible spectrophotometer was equipped with a self-centering sample holder having a polarizer analyzer (Moxtek ProFlux™ polarizer). The instrument was set with the following parameters: Scan speed=600 nm/min; Data interval=1.0 nm; Integration time=100 ms; Absorbance range=0–6.5; Y mode=absorbance; X-mode=nanometers and the scanning range was 400 to 800 nm. Options were set for 3.5 SBW (slit band width), and double for beam mode. Baseline options were set for Zero/baseline correction. A sample of each substrate material without the orientation facility and/or the coating adapted to polarize at least transmitted radiation were used to set the Zero/Baseline correction. For the samples wherein the substrate was coated with a primer coating, the Zero/Baseline correction was set using the primer-coated substrate. Also, 2.5 Neutral Density filters were in the reference path for all scans. The coated substrate samples were tested in air, at room temperature (73° F.±5° F.) maintained by the lab air conditioning system.

Orientation of the sample polarizer to be parallel and perpendicular to the analyzer polarizer was accomplished in the following manner. The Cary 4000 was set to 500 nm (or at a peak absorbance of the sample), and the absorbance was monitored as the sample was rotated in small increments (1 to 5 degrees). The rotation of the sample was continued until the absorbance was maximized. This position was defined as the perpendicular or 90 degree position. The parallel position was obtained by rotating the stage 90 degrees clockwise or counter-clockwise.

The absorption spectra was collected at both 90 and 0 degrees for each sample. Data analysis was handled with the Igor Pro software available from WaveMetrics. The spectra were loaded into Igor Pro and the absorbances were used to calculate the absorption ratios at 566 nm. The calculated absorption ratios are listed in Table 1.

In Table 1, the sample numbers correspond to the coating composition (e.g., Examples 1–6) applied to the substrate tested. Different alphabetic letters associated with the sample number denote different substrates as follows: "A" denotes a polymerizate of CR39® monomer; "B" denotes a polymerizate of TRIVEX® 151 lens material; "C" denotes the photochromic lenses from Transition Optical Incorporated having a refractive index of 1.50; and "D" denotes a polymerizate of CR-607® monomer. Double letters indicate that the substrate was coated twice in Part C. The results for Samples 6A1 and 6A2 were arithmetic averages of 2 results. The results for the other samples were of single coated substrates tested.

TABLE 1

| Sample Number | Primer Coating Present | Absorption Ratio |
| --- | --- | --- |
| 1A | − | 3.1 |
| 2A | − | 5.7 |
| 3A | − | 2.4 |
| 4A | − | 4.0 |
| 5A | − | 5.4 |
| 6A | − | 2.6 |
| 6AA | − | 4.4 |
| 6B | − | 3.0 |
| 6C | − | 3.1 |
| 6D | − | 3.9 |
| 6A1 | + | 6.2 |
| 6A2 | − | 7.0 |
| 6A(Magnetic) | + | 5.4 |

As indicated in Table 1, the at least partial coatings adapted to polarize at least transmitted radiation according to the non-limiting examples described above exhibited absorption ratios ranging from 2.4 to 7.0.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention, as defined by the appended claims.

The invention claimed is:

1. An ophthalmic element comprising:
   at least one at least partial coating comprising an alignment medium on at least a portion of at least one exterior surface of the ophthalmic element;
   at least one at least partial coating comprising an alignment transfer material on at least a portion of the at least one at least partial coating comprising the alignment medium; and
   at least one at least partial coating comprising an anisotropic material and at least one dichroic material on at least a portion of the at least one at least partial coating comprising the alignment transfer material.

2. The ophthalmic element of claim 1 wherein at least a portion of the alignment medium is at least partially ordered in a first general direction, at least a portion of the alignment transfer material is at least partially aligned in a second general direction that is generally parallel to the first general direction, at least a portion of the anisotropic material is at least partially aligned in a third general direction that is generally parallel to the second general direction, and at least a portion of the at least one dichroic material is at least partially aligned with at least a portion of the anisotropic material such that a long axis of the at least a portion of the at least one dichroic material is generally parallel to the third general direction of the at least partially aligned anisotropic material.

3. The ophthalmic element of claim 1 wherein the alignment medium is chosen from photo-orientation materials, rubbed-orientation materials, and liquid crystal materials.

4. The ophthalmic element of claim 1 wherein the alignment transfer material is a liquid crystal material chosen from liquid crystal polymers, liquid crystal pre-polymers, and liquid crystal monomers.

5. The ophthalmic element of claim 1 wherein at least one at least partial coatings comprising the alignment transfer material has an average thickness ranging from 0.5 microns to 25 microns.

6. The ophthalmic element of claim 1 wherein at least one at least partial coatings comprising the alignment transfer material has an average thickness ranging from 5 microns to 10 microns.

7. The ophthalmic element of claim 1 wherein at least one at least partial coating comprising the anisotropic material and at least one dichroic material has an average thickness of at least 5 microns.

8. The ophthalmic element of claim 1 wherein the anisotropic material is a liquid crystal material chosen from liquid crystal polymers, liquid crystal pre-polymers, and liquid crystal monomers.

9. The ophthalmic element of claim 1 wherein the anisotropic material is a liquid crystal material having at least one functional group chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, and vinyl ethers.

10. The ophthalmic element of claim 1 further comprising at least one at least partial primer coating between at least a portion of the at least one at least partial coating comprising an alignment medium and the at least a portion of the at least one exterior surface of the ophthalmic element.

11. The ophthalmic element of claim 1 further comprising at least one additional at least partial coating chosen from photochromic coatings, anti-reflective coatings, transitional coatings, primer coatings, and protective coatings on at least a portion of the ophthalmic element.

12. A method of making an ophthalmic element comprising:
applying an at least partial coating comprising an alignment medium to at least a portion of at least one exterior surface of the ophthalmic element;
at least partially ordering at least a portion of the alignment medium;
applying an at least partial coating comprising an anisotropic material and at least one dichroic material to at least a portion of the at least partial coating comprising the at least partially ordered alignment medium; and
at least partially aligning at least a portion of the at least one dichroic material.

13. The method of claim 12 wherein at least partially ordering at least a portion of the alignment medium comprises at least one of exposing the at least a portion of the alignment medium to plane-polarized ultraviolet radiation, exposing the at least a portion of the alignment medium to infrared radiation, exposing the at least a portion of the alignment medium to a magnetic field, exposing the at least a portion of the alignment medium to an electric field, drying the at least a portion of the alignment medium, etching the at least a portion of the alignment medium, exposing the at least a portion of the alignment medium to a shear force, and rubbing the at least a portion of the alignment medium.

14. The ophthalmic element of claim 1 wherein the at least one at least partial coating comprising the alignment medium further comprises at least one of a dichroic material, a photochromic material, a dye, an alignment promoter, a kinetic enhancing additive, a photoinitiator, a solvent, a light stabilizer, a heat stabilizer, a mold release agent, a rheology control agent, a leveling agent, a free radical scavenger, and an adhesion promoter.

15. The ophthalmic element of claim 1 wherein the at least one at least partial coating comprising the alignment transfer material further comprises at least one of a dichroic material, a photochromic material, a dye, an alignment promoter, a kinetic enhancing additive, a photoinitiator, a solvent, a light stabilizer, a heat stabilizer, a mold release agent, a rheology control agent, a leveling agent, a free radical scavenger, and an adhesion promoter.

16. The ophthalmic element of claim 1 wherein the at least one dichroic material is chosen from polymerizable dichroic materials, azomethines, indigoids, thioindigoids, merocyanines, indans, quinophthalonic dyes, perylenes, phthaloperines, triphenodioxazines, indoloquinoxalines, imidazotriazines, tetrazines, azo and (poly)azo dyes, benzoquinones, naphthoquinones, anthraquinone and (poly)anthraquinones, anthrapyrimidinones, iodine and iodates.

17. The ophthalmic element of claim 1 wherein the at least one at least partial coating comprising the anisotropic material and at least one dichroic material further comprises at least one of a photochromic material, a dye, an alignment promoter, a kinetic enhancing additive, a photoinitiator, a solvent, a light stabilizer, a heat stabilizer, a mold release agent, a rheology control agent, a leveling agent, a free radical scavenger, and an adhesion promoter.

18. The method of claim 12 wherein applying the at least partial coating comprising the anisotropic material and at least one dichroic material to the at least a portion of the at least partial coating comprising the at least partially ordered alignment medium comprises:
applying a mixture of an anisotropic material and at least one dichroic material to the at least a portion of the at least partial coating comprising the at least partially ordered alignment medium; and
wherein at least partially aligning at least a portion of the at least one dichroic material comprises:
at least partially aligning at least a portion of the anisotropic material with at least a portion of the at least partial coating comprising the at least partially ordered alignment medium, and
at least partially aligning at least a portion of the at least one dichroic material with at least a portion of the at least partially aligned portion of the anisotropic material.

19. The method of claim 18 further comprising at least partially setting at least a portion of the at least partial coating comprising the anisotropic material and the at least one dichroic material after at least partially aligning at least a portion of the at least one dichroic material.

20. An ophthalmic element comprising:
at least one at least partial coating comprising an at least partially ordered alignment medium on at least a portion of at least one exterior surface of the ophthalmic element; and
at least one at least partial coating comprising at least one at least partially aligned anisotropic material and at least one at least partially aligned dichroic material on at least a portion of the at least one at least partial coating comprising the at least partially ordered alignment medium.

* * * * *